US011556548B2

(12) United States Patent
Nguyen et al.

(10) Patent No.: US 11,556,548 B2
(45) Date of Patent: Jan. 17, 2023

(54) INTELLIGENT QUERY SYSTEM FOR ATTACHMENTS

(71) Applicant: Microsoft Technology Licensing, LLC, Redmond, WA (US)

(72) Inventors: Amy Huyen Phuoc Nguyen, Bellevue, WA (US); Bhaskar Mitra, London (GB); Christophe Jacky Henri Van Gysel, Amsterdam (NL); Grzegorz Stanislaw Kukla, Sliwice (PL); Lynn Carter Ayres, Redmond, WA (US); Mark Rolland Knight, Bellevue, WA (US); Matteo Venanzi, London (GB); Nicola Cancedda, London (GB); Rachel Elizabeth Sirkin, Seattle, WA (US); Robin Michael Thomas, Kirkland, WA (US); Roy Rosemarin, London (GB); Shobana Balakrishnan, Redmond, WA (US); Sri Ramya Mallipudi, Redmond, WA (US); Tariq Sharif, Sammamish, WA (US); Yamin Wang, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 371 days.

(21) Appl. No.: 15/672,095

(22) Filed: Aug. 8, 2017

(65) Prior Publication Data

US 2019/0050406 A1  Feb. 14, 2019

(51) Int. Cl.
*H04L 67/10* (2022.01)
*G06F 16/2457* (2019.01)
(Continued)

(52) U.S. Cl.
CPC ...... *G06F 16/24578* (2019.01); *G06F 16/248* (2019.01); *G06F 16/24535* (2019.01);
(Continued)

(58) Field of Classification Search
CPC .... G06F 16/24578; H04L 67/10; H04L 67/01
See application file for complete search history.

(56) References Cited

U.S. PATENT DOCUMENTS 5,109,413 A  4/1992  Comerford et al.
6,505,167 B1  1/2003  Horvitz et al.
(Continued)

FOREIGN PATENT DOCUMENTS

CN  103079008 A  5/2013
WO  2013153438 A1  10/2013

OTHER PUBLICATIONS

Definition—What does Device mean?, Nov. 8, 2012, Techopedia, 2 pages (Year: 2012).*

(Continued)

*Primary Examiner* — Apu M Mofiz
*Assistant Examiner* — Dara J Glasser
(74) *Attorney, Agent, or Firm* — Shook, Hardy & Bacon L.L.P.

(57) ABSTRACT

Systems and methods are provided that automatically process a message input, construct an intelligent query based on the processing of the message input, and provide at least one attachable entity according to the processing results and the intelligent query. In some example aspects, a message is received. A natural language processor to determine if the message is requesting content may then process the message. If the message is determined to be requesting content, then candidate sub-queries may be generated to serve as a training set for a query that will be sent to an external search engine to retrieve the attachable entity. The sub-queries may (Continued)

be ranked in order of relevance and performance score. The highest ranked sub-queries may then be used in the actual query that is fired against the external search engine. The external search engine may search local and remote repositories for the top K most relevant attachable entities and present them to a user for attachment in a reply message.

7 Claims, 14 Drawing Sheets

(51) Int. Cl.
    *G06F 16/248*     (2019.01)
    *G06F 16/951*     (2019.01)
    *G06F 16/2453*    (2019.01)
    *G06Q 10/10*      (2012.01)
    *H04L 67/02*      (2022.01)

(52) U.S. Cl.
    CPC ......... *G06F 16/951* (2019.01); *G06Q 10/107* (2013.01); *H04L 67/02* (2013.01); *H04L 67/10* (2013.01)

(56) References Cited

U.S. PATENT DOCUMENTS

| | | | |
|---|---|---|---|
| 6,598,017 B1 | 7/2003 | Yamamoto et al. | |
| 6,970,908 B1* | 11/2005 | Larky | H04L 51/00 709/201 |
| 7,136,710 B1 | 11/2006 | Hoffberg et al. | |
| 7,158,980 B2 | 1/2007 | Shen | |
| 7,580,719 B2 | 8/2009 | Karmarkar | |
| 7,584,253 B2 | 9/2009 | Curbow et al. | |
| 7,636,701 B2 | 12/2009 | Funge et al. | |
| 7,761,524 B2 | 7/2010 | Carmel et al. | |
| 8,032,477 B1 | 10/2011 | Hoffberg et al. | |
| 8,286,085 B1 | 10/2012 | Denise | |
| 8,341,175 B2 | 12/2012 | Perantatos et al. | |
| 8,385,975 B2 | 2/2013 | Forutanpour et al. | |
| 8,423,577 B1 | 4/2013 | Lee et al. | |
| 8,996,639 B1 | 3/2015 | Faaborg et al. | |
| 9,111,291 B2 | 8/2015 | Lempel et al. | |
| 9,213,941 B2 | 12/2015 | Petersen | |
| 9,813,363 B1 | 11/2017 | Caldwell et al. | |
| 10,015,124 B2 | 7/2018 | McGregor et al. | |
| 10,902,481 B1* | 1/2021 | Kanefsky | H04M 3/42068 |
| 2002/0139839 A1 | 10/2002 | Catan | |
| 2003/0177190 A1 | 9/2003 | Moody et al. | |
| 2004/0068545 A1 | 4/2004 | Daniell et al. | |
| 2006/0069990 A1* | 3/2006 | Yozell-Epstein | G06Q 10/107 715/273 |
| 2007/0179776 A1 | 8/2007 | Segond et al. | |
| 2007/0244976 A1 | 10/2007 | Carroll et al. | |
| 2008/0086455 A1 | 4/2008 | Meisels et al. | |
| 2008/0091406 A1 | 4/2008 | Baldwin et al. | |
| 2008/0115149 A1 | 5/2008 | Rupp et al. | |
| 2008/0233932 A1 | 9/2008 | Sapp | |
| 2009/0076795 A1 | 3/2009 | Bangalore et al. | |
| 2009/0119290 A1* | 5/2009 | Lee | H04L 51/00 |
| 2009/0170486 A1 | 7/2009 | Culbert et al. | |
| 2009/0235280 A1 | 9/2009 | Tannier et al. | |
| 2010/0005087 A1 | 1/2010 | Basco et al. | |
| 2010/0228710 A1* | 9/2010 | Imig | G06F 16/9535 707/706 |
| 2010/0325011 A1* | 12/2010 | Foster | G06Q 30/0625 705/26.7 |
| 2012/0215774 A1* | 8/2012 | Finley | G06F 16/3334 707/E17.014 |
| 2012/0245944 A1 | 9/2012 | Gruber et al. | |
| 2012/0290511 A1 | 11/2012 | Frank et al. | |
| 2012/0331404 A1 | 12/2012 | Buford et al. | |
| 2013/0007037 A1 | 1/2013 | Azzam et al. | |
| 2013/0103624 A1 | 4/2013 | Fhieberger | |
| 2013/0103692 A1 | 4/2013 | Raza et al. | |
| 2013/0159220 A1 | 6/2013 | Winn et al. | |
| 2014/0012923 A1 | 1/2014 | Caldwell et al. | |
| 2014/0052680 A1 | 2/2014 | Nitz et al. | |
| 2014/0314225 A1 | 10/2014 | Riahi et al. | |
| 2014/0359480 A1 | 12/2014 | Vellal et al. | |
| 2015/0149896 A1 | 5/2015 | Radhakrishnan | |
| 2015/0185995 A1 | 7/2015 | Shoemaker et al. | |
| 2015/0281149 A1* | 10/2015 | Masterson | H04L 51/02 715/752 |
| 2015/0302301 A1 | 10/2015 | Petersen | |
| 2015/0310072 A1* | 10/2015 | Dietz | G06F 16/22 707/741 |
| 2015/0340033 A1 | 11/2015 | Di fabbrizio et al. | |
| 2016/0328681 A1 | 11/2016 | Portnoy et al. | |
| 2016/0359771 A1 | 12/2016 | Sridhar | |
| 2016/0379119 A1 | 12/2016 | Kumar et al. | |
| 2017/0060844 A1 | 3/2017 | He et al. | |
| 2017/0093767 A1 | 3/2017 | Chinnapatlolla et al. | |
| 2017/0132141 A1 | 5/2017 | Mien et al. | |
| 2017/0195269 A1* | 7/2017 | Miklos | G06N 20/00 |
| 2018/0032997 A1 | 2/2018 | Gordon et al. | |
| 2018/0359199 A1 | 12/2018 | Nguyen et al. | |
| 2021/0112022 A1 | 4/2021 | Nguyen et al. | |

OTHER PUBLICATIONS

Albakour, et al., "Sentence-Level Attachment Prediction", In Proceedings of Information Retrieval Facility Conference In Advances in Multidisciplinary Retrieval, May 31, 2010, 14 Pages.

"International Search Report and Written Opinion Issued in PCT Application No. PCT/US2018/038652", dated Aug. 16, 2018, 12 Pages.

Al, Qingyao, et al., "Characterizing Email Search Using Large-scale Behavioral Logs and Surveys", In Proceedings of the 26th International Conference on World Wide Web, Apr. 3, 2017, pp. 1511-1520.

"Say Allo", Retrieved From: https://allo.google.com/, Retrieved On: May 4, 2017, 10 Pages.

Arguello, Jaime, et al., "Using Query Performance Predictors to Improve Spoken Queries", In Proceedings of European Conference on Information Research, Mar. 20, 2016, pp. 309-321.

Balasubramanian, Niranjan, et al., "Exploring Reductions for Long Web Queries", In Proceedings of the 33rd International ACM SIGIR Conference on Research and Development in Information Retrieval, Jul. 19, 2010, pp. 571-578.

Balog, Krisztian, et al., "Formal Models for Expert Finding in Enterprise Corpora", In Proceedings of the 29th annual International ACM SIGIR Conference on Research and Development in Information Retrieval, Aug. 6, 2006, pp. 43-50.

Bendersky, Michael, "Analysis of Long Queries in a Large Scale Search Log", In Proceedings of the 2009 workshop on Web Search Click Data, Feb. 9, 2009, pp. 8-14.

Bendersky, Michael, et al., "Discovering Key Concepts in Verbose Queries", In Proceedings of the 31st annual international ACM SIGIR conference on Research and Development in Information Retrieval, Jul. 20, 2008, pp. 491-498.

Carvalho, Vitor R., et al., "On the Collective Classification of Email Speech Acts", In Proceedings of the 28th annual international ACM SIGIR conference on Research and Development in Information Retrieval, Aug. 15, 2005, pp. 345-352.

Castro, Dotan Di., et al., "You've got Mail, and Here is What you Could do With It! Analyzing and Predicting Actions on Email Messages", In Proceedings of the Ninth ACM International Conference on Web Search and Data Mining, Feb. 8, 2016, pp. 307-316.

Centintas, Suleyman, et al., "Effective Query Generation and Post-processing Strategies for Prior Art Patent Search", In Journal of the American Society for Information Science and Technology, vol. 63, Issue 3, Mar. 2012, pp. 512-527.

Zhao, Le, et al., "Term Necessity Prediction", In Proceedings of the 19th ACM international conference on Information and Knowledge Management, Oct. 26, 2010, pp. 259-268.

Dredze, Mark, et al., "Sorry, I Forgot the Attachment": Email Attachment Prediction, In CEAS, Jul. 27, 2006, 3 Pages.

Elsweiler, David, et al., "Towards Task-Based Personal Information Management Evaluations", In Proceedings of the 30th Annual

(56) References Cited

OTHER PUBLICATIONS

International ACM SIGIR conference on Research and Development in Information Retrieval, Jul. 23, 2007, pp. 23-30.
Far, Mona Golestan., et al., "On Term Selection Techniques for Patent Prior Art Search", In Proceedings of the 38th International ACM SIGIR Conference on Research and Development in Information Retrieval,, Aug. 9, 2015, pp. 803-806.
Gottfried, Keren, "Interconnected World: Communication & Social Networking", Retrieved From: https://www.ipsos.com/en-us/interconnected-world-communication-social-networking, Mar. 27, 2012, 3 Pages.
Grevet, Catherine, et al., "Overload Is Overloaded: Email In The Age Of Gmail.", In Proceedings of the SIGCHI Conference on Human Factors in Computing Systems, Apr. 26, 2014, pp. 793-802.
Gupta, Manish, "Information Retrieval With Verbose Queries", In Proceedings of the 38th International ACM SIGIR Conference on Research and Development in Information Retrieval, Aug. 9, 2015, pp. 1121-1124.
He, Ben, et al., "Inferring Query Performance Using Pre-Retrieval Predictors", In International Symposium on String Processing and Information Retrieval, Oct. 5, 2004, pp. 43-54.
Henderson, Matthew, et al., "Efficient Natural Language Response Suggestion for Smart Reply", Retrieved From: https://arxiv.org/pdf/1705.00652.pdf, May 1, 2017, 15 Pages.
Huston, Samuel, "Evaluating Verbose Query Processing Techniques", In Proceedings of the 33rd international ACM SIGIR conference on Research and Development in Information Retrieval, Jul. 19, 2010, pp. 291-298.
Kim, Youngho, et al., "Automatic Boolean Query Suggestion For Professional Search", In Proceedings of the 34th international ACM SIGIR conference on Research and Development in Information Retrieval, Jul. 24, 2011, pp. 825-834.
Kumaran, Giridhar, et al., "Reducing Long Queries Using Query Quality Predictors", In Proceedings of the 32nd international ACM SIGIR conference on Research and Development in Information Retrieval, Jul. 19, 2009, pp. 564-571.
Lupu, et al., "Patent Retrieval", Foundation and Trends in Information Retrieval, vol. 7, No. 1, Jan. 2013, pp. 1-97.
Mahdabi, Parvaz, et al., "Building Queries for Prior-Art Search", In Proceedings of Information Retrieval Facility Conference, Jun. 6, 2011, pp. 3-15.
Maxwell, Tamsin, et al., "Compact Query Term Selection using Topically Related Text", In Proceedings of the 36th international ACM SIGIR conference on Research and Development in Information Retrieval, Jul. 28, 2013, pp. 583-592.
Meij, Edgar, et al., "Learning Semantic Query Suggestions", In Proceedings of 8th International Semantic Web Conference (ISWC 2009), Oct. 25, 2009, pp. 424-440.
"International Search Report along with Written Opinion in PCT No. PCT/US2018/034023", dated Jul. 19, 2018, 12 Pages.
Petkova, Desislava, et al., "Proximity-Based Document Representation for Named Entity Retrieval", In Proceedings of the sixteenth ACM conference on Conference on information and knowledge management, Nov. 6, 2007, pp. 731-740.
Purcell, Kristen, et al., "Email and the Internet Are the Dominant Technological Tools in American Workplaces", Retrieved From: http://www.pewinternet.org/2014/12/30/email-and-the-internet-are-the-dominant-technological-tools-in-american-workplaces/, Dec. 30, 2014, 9 Pages.
Weil, Shawn A., et al., "New Approaches to Overcoming E-mail Overload", In Proceedings of the Human Factors and Ergonomics Society Annual Meeting, vol. 48, Issue: 3, Sep. 1, 2004, pp. 547-551.
Whittaker, Steve, et al., "Email Overload: Exploring Personal Information Management of Email", In Proceedings of the SIGCHI Conference on Human Factors in Computing Systems, Apr. 13, 1996, pp. 276-283.

Xue, Xiaobing, et al., "Automatic Query Generation for Patent Search", In Proceedings of the 18th ACM conference on Information and Knowledge Management, Nov. 2, 2009, pp. 2037-2040.
Xue, Xiaobing, et al., "Improving Verbose Queries Using Subset Distribution", In Proceedings of the 19th ACM international conference on Information and Knowledge Management, Oct. 26, 2010, pp. 1059-1068.
Xue, Xiaobing, et al., "Transforming Patents into Prior-Art Queries", In Proceedings of the 32nd international ACM SIGIR conference on Research and Development in Information Retrieval, Jul. 19, 2009, pp. 808-809.
Zhao, Ying, et al., "Effective Pre-Retrieval Query Performance Prediction Using Similarity And Variability Evidence", In Proceedings of the IR research, 30th European conference on Advances in information retrieval, Mar. 30, 2008, pp. 52-64.
"Non Final Office Action Issued in U.S. Appl. No. 15/620,671", dated Nov. 20, 2018, 14 Pages.
Black, Matthew, "Live from F8-"Group bots" with Messenger Chat Extensions", Retrieved From: https://chatbotsmagazine.com/live-from-f8-group-bots-with-messenger-chat-extensions-641a3d66b367, Apr. 18, 2017, 3 Pages.
Corston-Oliver, et al., "Task-Focused Summarization of Email", In Proceedings of the ACL 24 Workshop "Text Summarization Branches Out", Jul. 24, 2004, 8 Pages.
Feng, et al., "An Intelligent Discussion-Bot for Answering Student Queries in Threaded Discussions", In Proceedings of the 11th International Conference on Intelligent User Interfaces, Jan. 29, 2006, pp. 171-177.
Kannan, et al., "Smart Reply: Automated Response Suggestion for Email", In Proceeding of 22nd ACM SIGKDD International Conference on Knowledge Discovery and Data Mining, Aug. 13, 2016, pp. 955-964.
Moynihan, Tim, "How Google AI Automagically Answers your Emails", Retrieved From: https://www.wired.com/2016/03/google-inbox-auto-answers-emails/, Mar. 17, 2016, 4 Pages.
Temperton, James, "Google's machine learning Inbox can now reply to your emails", Retrieved from: http://www.wired.co.uk/article/google-smart-reply-machine-learning-email, Nov. 3, 2015, 3 Pages.
Ulrich, Jan, "Supervised Machine Learning for Email Thread Summarization", In a thesis submitted in partial fulfillment of the requirements for for the degree of Master Of Science in the Faculty of Graduate Studies of University Of British Columbia, Sep. 2008, 82 Pages.
Demartini, Gianluca, et al., "A Vector Space Model For Ranking Entities And Its Application To Expert Search", In Proceedings of the 31th European Conference on IR Research on Advances in Information Retrieval, Apr. 6, 2009, pp. 189-201.
"Final Office Action Issued In U.S. Appl. No. 15/620,671", dated Jun. 6, 2019, 17 Pages.
"Non Final Office Action Issued in U.S. Appl. No. 15/620,671", dated Sep. 12, 2019, 19 Pages.
"Non Final Office Action Issued in U.S. Appl. No. 17/125,374", dated May 21, 2021, 12 Pages.
"Final Office Action Issued in U.S. Appl. No. 15/620,671", dated Feb. 27, 2020, 21 Pages.
"Notice of Allowance Issued in U.S. Appl. No. 15/620,671", dated Aug. 12, 2020, 12 Pages.
"Office Action Issued in European Patent Application No. 18730591.7", dated Sep. 17, 2021, 8 Pages.
"Office Action Issued in European Patent Application No. 18743627.4", dated Nov. 30, 2021, 7 Pages.
"Summons to attend Oral Proceedings Issued in European Patent Application No. 18730591.7", Mailed Date: Mar. 24, 2022, 11 Pages.

\* cited by examiner

INTELLIGENT QUERY SYSTEM FOR ATTACHMENTS

BACKGROUND

Many email messages consist of requests for content (e.g., a document or a URL). The user who received the request then proceeds to perform the cumbersome process of searching for the known item to attach to her reply. Often, the content that is requested happens to already be present in the mailbox of the user receiving the request for content. Thus, users need to execute mailbox search queries or search or browse other repositories to retrieve the requested content manually before attaching it to their response. Similarly, when creating a new message discussing specific content, e.g., a document, email, or URL, users spend significant time searching for the proper content to attach to the email. These everyday repetitious and inefficient processes consume valuable time and hardware resources.

It is with respect to these and other general considerations that example aspects, systems, and methods are described herein. Also, although relatively specific problems are discussed, it should be understood that the examples should not be limited to solving the specific problems identified in the background.

SUMMARY

Embodiments of the current disclosure relate to methods and systems for automatically providing users with suggestions for email attachments according to the substance of an email message and/or email chain. Efficiencies gained by the automatic suggestions provide for a better overall experience, and also provides for better utilization, in some cases, of technological resources, such as local memory storage, battery life, and hardware sustainability. The intelligent query system for email attachment retrieval may be integrated with various applications, including but not limited to Microsoft® Outlook, Google® Gmail, Yahoo® Mail, AOL® Mail, and other email services.

The intelligent query system for email attachment retrieval provides contextual recommendations of attachable entities (e.g., hyperlinks, attachments, etc.) within email conversations. For instance, when a user replies to a message, the intelligent query system may return a ranking of attachable entities for the user to attach to her reply. The set of attachable entities may consist of entities (e.g., attachments) present in the mailbox of the user at a certain time, entities stored locally on a computing device, entities stored remotely on a cloud server, or a combination of the previously mentioned.

A processor-implemented method for building intelligent queries for attachment retrieval is disclosed herein. The method includes processing at least one message for a request for content, and based on the processing of the at least one message for a request for content, the method may construct at least one query. The method further includes submitting the at least one query to a search engine, and the method then receives a ranking of at least one attachable entity. Additionally, the ranking of the at least one attachable entity may be presented, and the at least one query may be stored.

In another aspect, a computer device comprising at least one processing unit, at least one memory storing processor-executable instructions that when executed by the at least one processing unit cause the computing device to receive at least one message is provided. Additionally, the computing device processes the at least one message for a request for content, and based on the processing of the at least one message for a request for content, constructs at least one query. The computing device may submit the at least one query to a search engine, where a ranking of the at least one attachable entity may be received. The computing device may then present the ranking of the at least one attachable entity. The computing device further stores the at least one query and the ranking of the at least one attachable entity in a database.

In yet another aspect, a processor-readable storage medium storing instructions for executing on one or more processors of a computing device, a method providing intelligent queries for attachable entities, is provided. The method includes receiving at least one message and processing the at least one message for a request for content. Based on the processing of the at least one message for a request for content, the method further includes constructing at least one query. The method submits the at least one query to a search engine and receives a ranking of the at least one attachable entity. Additionally, the method presents the ranking of the at least one attachable entity and stores that at least one query and the ranking of the at least one attachable entity in a database.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects.

Figure 1:
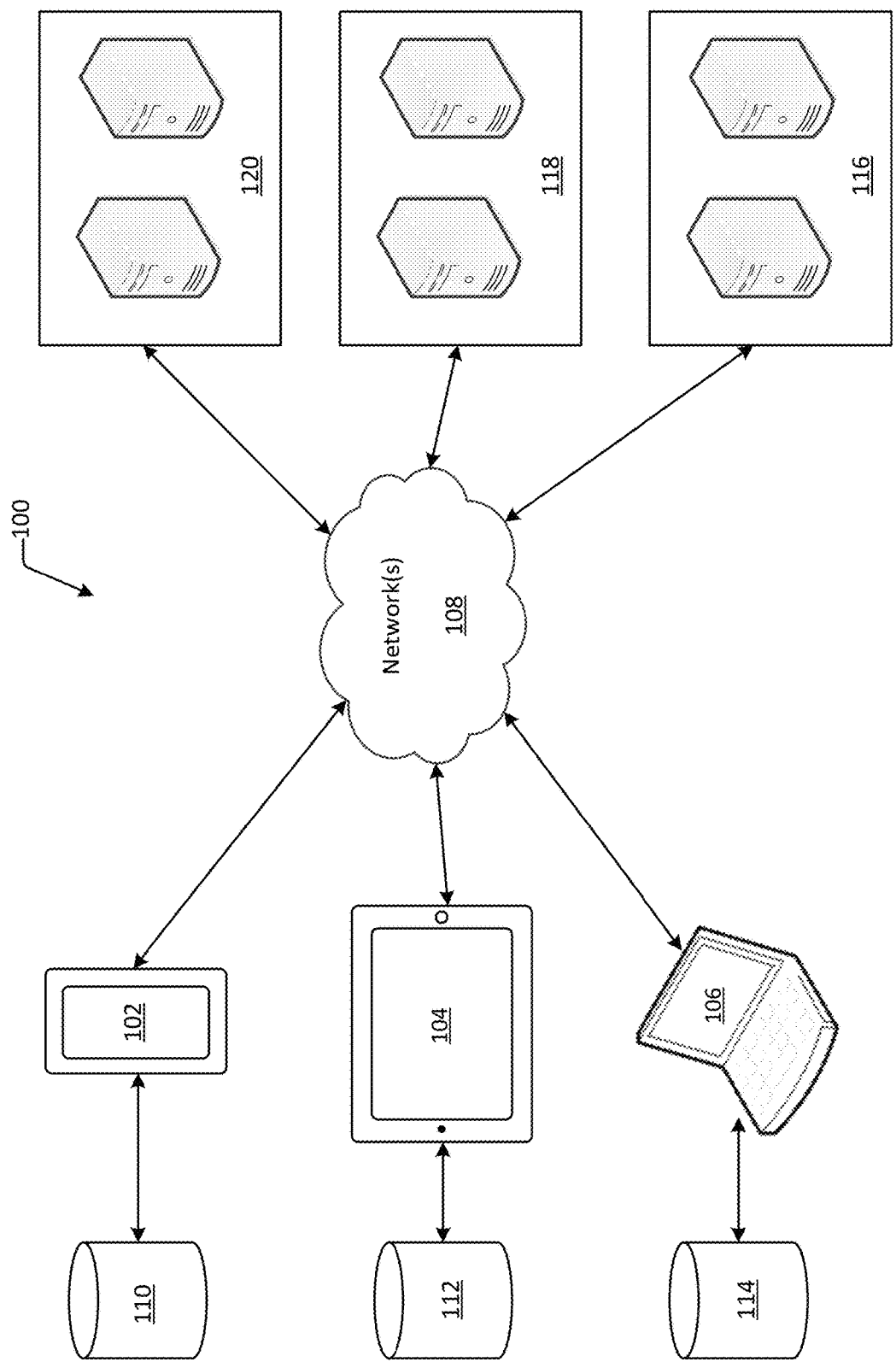
FIG. 1 illustrates an example of a distributed system for receiving and storing data related to intelligent query building for email attachment retrieval.

FIG. 1 illustrates an example of a distributed system 100 for receiving and storing data related to intelligent query building for email attachment retrieval.

A system that facilitates providing real-time detection of relevant tokens in a message (i.e., portions of character sequences, such as keywords, phrases, sentences, and paragraphs, etc.) and automatically builds intelligent queries for suggested email attachments may be run on an electronic device including, but not limited to, client devices such as a mobile phone 102, a tablet 104, and a personal computer 106. The disclosed system may receive message data from a messaging application, such as an electronic mail application, running on a device. The disclosed system may then process that message data locally, remotely, or using a combination of both. During processing, the disclosed system may rely on local and remote databases to generate the most appropriate attachable entities to provide back to the user. This may be accomplished by utilizing local data stored in a local database 110, 112, and 114, remote database stored on servers 116, 118, and 120, or a combination of both. Additionally, generating the intelligent queries that may be used to automatically provide the most relevant attachable entities may utilize an external search engine. The external search engine may be accessed via network 108 and processing data on server(s) 116, 118, and/or 120.

Mobile phone 102 may utilize local database 110 and access servers 116, 118, and/or 120 via network(s) 108 to process the message data and provide an appropriate result set of attachable entities. In other example aspects, tablet 104 may utilize local database 112 and network(s) 108 to synchronize the relevant tokens extracted from the processed message data and the subsequent intelligent email attachments across client devices and across all servers running the intelligent query system. For example, if the initial message input data is received on tablet 104, the message input data and subsequent attachable entity result set generation may be saved locally in database 112, but also shared with servers 116, 118, and/or 120 via the network(s) 108.

In other example aspects, the intelligent email attachment system may be employed locally. For instance, if the system servers 116, 118, and 120 are down, the intelligent email attachment system may still operate on a client device, such as mobile device 102, tablet 104, and computer 106. In this case, a subset of the trained dataset applicable to the client device type and at least a client version of the machine-learning algorithms may be locally cached so as to automatically respond to relevant tokens (i.e., words, phrases, etc.) highlighted in the message data on the client device. The system servers 116, 118, and 120 may be down for a variety of reasons, including but not limited to, power outages, network failures, operating system failures, program failures, misconfigurations, and hardware deterioration.

As should be appreciated, the various methods, devices, components, etc., described with respect to FIG. 1 are not intended to limit systems 100 to being performed by the particular components described. Accordingly, additional topology configurations may be used to practice the methods and systems herein and/or components described may be excluded without departing from the methods and systems disclosed herein.

Figure 2:
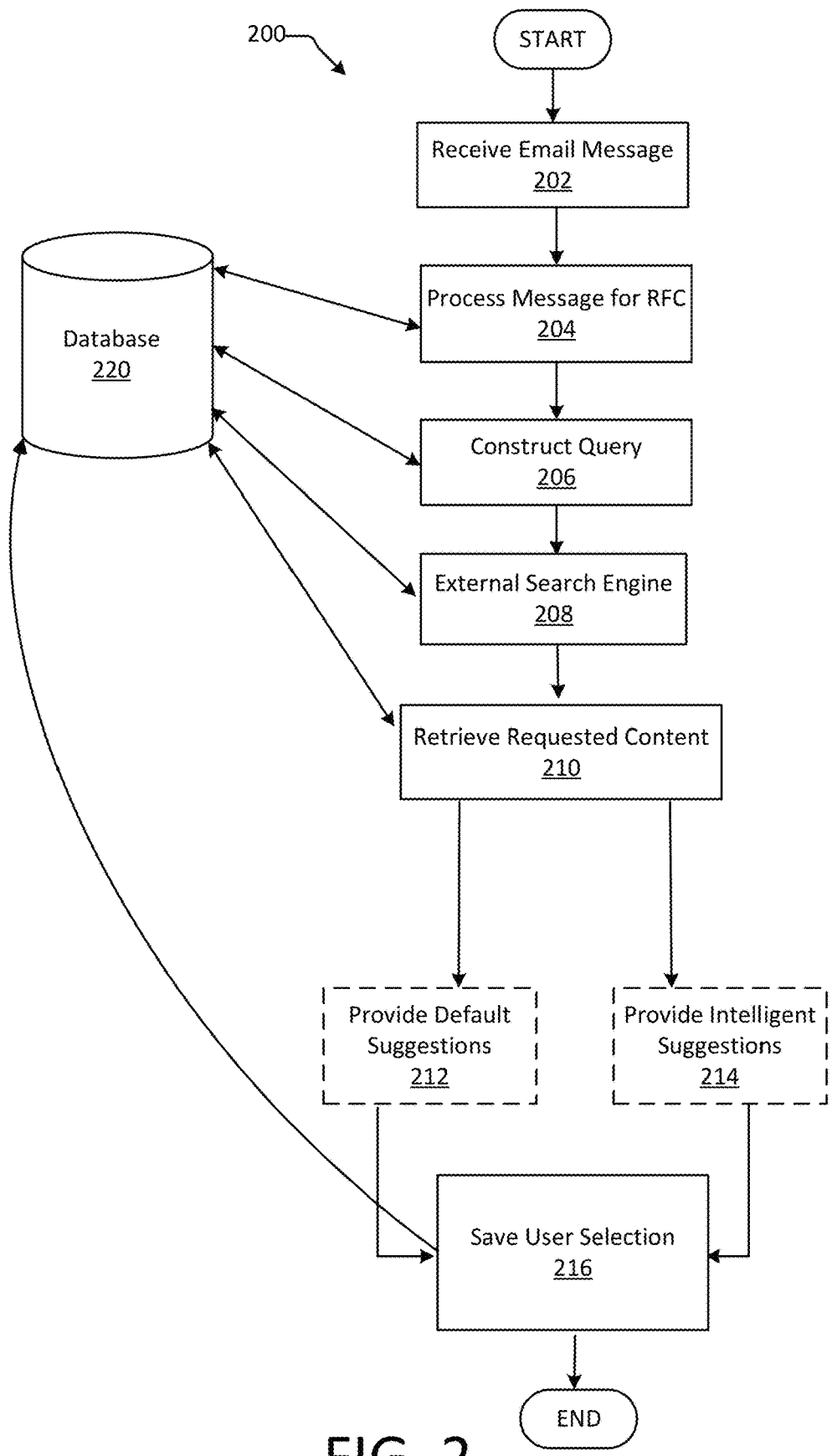
FIG. 2 is a block diagram illustrating a method for intelligent query building for email attachment retrieval.

FIG. 2 is a block diagram illustrating a method for intelligent query building for email attachment retrieval.

Method 200 begins with receive email message operation 202. In some example aspects, an email may be received by method 200 when a new email arrives in a user's inbox. In other example aspects, method 200 may receive an email when a message already located in a user's inbox is selected. For example, an email may be received into an inbox, but that email is not acted upon immediately. When that email is acted upon (e.g., selected), then that email may be received by method 200. In other example aspects, the incoming email message may be received and processed automatically.

After receive email message operation 202, the email message is processed to determine if it is a request-for-content (RFC) message. An RFC message comprises characteristics of a message requesting content. For example, a message with the phrase "can you send me a copy?" or "please send me the document" indicates that the sender is requesting content from the recipient. The recipient may then attach the requested content in a subsequent email message. To determine if a message is requesting content, the system may utilize a natural language processor that considers, among other facets, tokens, features, domains, and semantics of the message. For example, if a message contains the word "attachment," method 200 may determine that the message is requesting content. In another example, the message may contain a question mark, which may indicate a request for content. In other example aspects, the message may contain a combination of various grammatical and semantical features that indicate that the message is a request for content. The process message for request-for-content (RFC) operation 204 is described in more detail in FIG. 3.

After the message is determined to be requesting content, a query to locate and attach the desired content may be constructed in operation 206. The construct query operation 206 may analyze the terms in the message and rank the terms. Constructing the query may further involve predicting the number of top-ranked terms to include in the query. The construct query operation 206 may construct a query according to a query extraction model that is trained using pseudo-queries or reference queries, extracted from training requests/replies. The query extraction model may be trained using previous messages that have been manually flagged to indicate requests for content. Based on this training set of data, the query extraction model may be used to automatically determine the highest ranked terms present in the message to include in the query.

Once the query is constructed at 206, the query may then be fired against an external search engine 208. The external search engine 208 may be able to search within the user's electronic mail inbox for the requested content. In other example aspects, the external search engine 208 may be able to search among locally stored files and repositories on an electronic device. In yet further example aspects, the external search engine 208 may be able to search among remotely stored files and repositories on a cloud server. In other example aspects, the external search engine 208 may be able to search among files and other attachable entities within third-party applications.

After the external search engine 208 has completed its search on the query that was constructed from the construct query operation 206, the requested content may be retrieved and returned at operation 210. The requested content may be a file, including but not limited to, a Microsoft® Word document, a PDF, a picture, a video, a spreadsheet, a presentation, or another type of file. In other example aspects, the requested content may comprise multiple files and file types. The requested content may be displayed as a set of possible files, in order of relevance. A ranking algorithm may determine the order of the requested content. The ranking algorithm may be based on but not limited to the identity of the requestor, the time/recency of the attachable entity, and the number of keywords from the request message that match up with keywords of the attachable entity (either in the title or in the body of the attachable entity). In further aspects, the ranking algorithm may be based on third party applications. For example, a request for a presentation from "yesterday's meeting" may cause the ranking algorithm to rank a presentation associated with a meeting scheduled in a third-party calendar application higher than other presentations. In another example, a request for "notes" from a certain meeting may cause the ranking algorithm to consider notes that are stored in a third-party note application, such as OneNote® or Evernote®. The ranking algorithm may strive to return the most relevant K attachable entities, where K represents an arbitrary number (e.g., "3"). The most relevant K attachable entities may eventually be displayed to a user who may then select which of the top K attachable entities to attach in a reply message.

In some example aspects, the raw message requesting content may be stored in database 220. Database 220 may refer to a single database or multiple databases. In other example aspects, the query that may be initially constructed before a quality check is run on the query may be stored in database 220. A query that has been constructed and checked for quality may also be stored in database 220. Furthermore, the results that are returned from the external search engine 208 may be stored in database 220. In further example aspects, the requested content that may be retrieved at operation 210 may be stored in database 220. The aforementioned data that may be stored in database 220 may be referenced to in future intelligent queries related to attachable entities. For example, when determining whether a message is requesting content, method 200 may reference database 220 to crosscheck previous messages that were determined to be requests for content. In other examples, when constructing a query based on the email message content, method 200 may refer to database 220 to crosscheck previously constructed queries. In further examples, the requested content that may be retrieved and suggested to a user may be first crosschecked with previous result sets stored in database 220. If a result set previously stored in database 220 indicates that the current result set may be of low quality (e.g., does not contain the proper attachable entity), method 200 may determine that the result set should be discarded.

In further example aspects, an offline quality check may occur within database 220. The quality check may determine the quality of the query terms that will eventually make up a future query that will be fired against an external search engine 208. The quality check may analyze equally-performing queries and remove queries whose union results in another query that performs at the same level as the constituents. For example, if the queries "bill gates", "gates family" and "bill gates family" all achieve the same reciprocal rank according to the ranking algorithm from the query extraction model, then two of the queries may be considered. For example, the first two queries—"bill gates" and "gates family"—may be discarded, and only the last query—"bill gates family"—will be submitted to the external search engine 208. In other example aspects, the quality check may involve supersets of queries that perform equal or worse. The inclusion of the additional terms in a superset query may not improve retrieval performance, and as a result, including the superset query may motivate the inclusion of superfluous terms that negatively impact retrieval results.

Once the requested content is retrieved in operation 210, method 200 determines whether to display default suggestions or intelligent suggestions. The default suggestions 212 may comprise attachable entity suggestions based on the most recently opened or closed files from the random access memory (RAM). In other example aspects, the default suggestions from operation 212 may comprise a set of attachable entities listed in alphabetical order. Conversely, intelligent suggestions from operation 214 may comprise the top K attachable entities. These may be the most relevant and most appropriate attachable entities to suggest to the user for a reply email based on the query construction, search results from the external search engine 208, and the content that was retrieved from the search results. The provide intelligent suggestions operation 214 may be executed if the suggestions meet a certain threshold of quality. If the top K suggested attachable entities do not meet a certain threshold of quality, then the provide default suggestions operation 212 may be executed. The quality threshold may be determined by an arbitrary scoring algorithm that compares the suggested set of attachable entities to the message requesting content and the constructed queries, among other comparable aspects of method 200.

Once the suggestions are displayed to the user as a result set, a user may select an attachable entity from the result set. Method 200 saves this user selection at operation 216. The selected attachable entity may then be attached to a reply message draft that may be subsequently sent back to the requestor. The user selection 216 may be saved in database 220, which may further indicate the level of quality of the result set, the constructed query, and the search results from the external search engine 208.

As should be appreciated, the various methods, devices, components, etc., described with respect to FIG. 2 are not intended to limit systems 200 to being performed by the particular components described. Accordingly, additional topology configurations may be used to practice the methods and systems herein and/or components described may be excluded without departing from the methods and systems disclosed herein.

Figure 3:
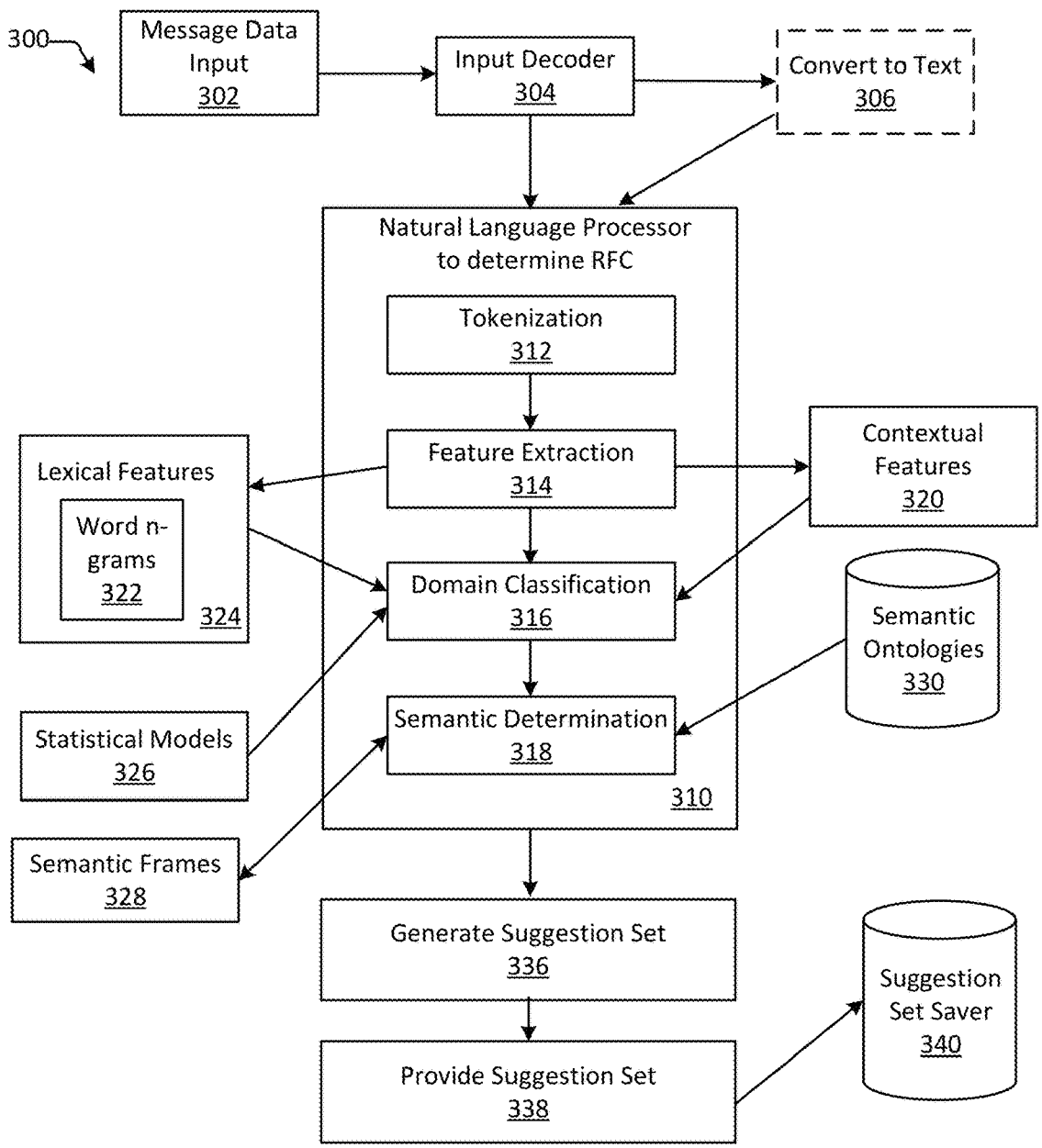
FIG. 3 is a block diagram illustrating a method for processing email message data to determine if message is requesting content.

FIG. 3 is a block diagram illustrating a method for processing email message data to determine if a message is requesting content.

As previously described, message data input 302 may refer to an electronic mail message, including but not limited to text, speech, handwriting, and attachments. Once the message data input 302 is received, the message data input 302 may be sent to the input decoder 304. The input decoder 304 may determine if the input should be converted to text. If a message data input, such as a non-textual input like speech input and/or handwriting input, should be converted to text, the input decoder 304 may transmit the message data input 302 to convert to text operation 306, where the input may be converted to text for processing by the natural language processor 310. For example, the message data input 302 may include a voice message. A voice message is a speech-based input and may need to be converted to text in order for processing through the natural language processor 310 to determine if the voice message is requesting content. A voice message may be received and a user may desire to reply to that voice message through an electronic mail application. The intelligent email attachment system may convert the voice message to text at convert to text operation 306, thereby initiating the processing phase. Eventually, an intelligent result set of attachable entities may be presented to the recipient of the voice message to attach to a reply message back to the sender of the voice message.

In some example aspects, the message data input 302 may not need to be converted to text because the message data input is already in textual form when it is received by method 300. As a result, the text-based message data may be transmitted from the input decoder 304 to the natural language processor 310 for processing. As previously mentioned, in other example aspects, the message data may be in non-text format and be transmitted to the convert to text operation 306. The convert to text operation 306 may convert the message data input to text and subsequently transmit the converted textual message data input to the natural language processor 310 for further processing.

Once the text-based message input is sent to the natural language processor 310, the natural language processor 310 may parse the message data text and extract various semantic features and classifiers, among other aspects of the message, to determine whether the message is requesting content. The message data may be converted into semantic representations that may be understood and processed by a machine utilizing machine-learning algorithms to intelligently disassemble the message data and determine if the message is requesting content.

In some example aspects, the natural language processor 310 may begin with tokenization operation 312. The tokenization operation 312 may extract specific tokens from the message input data. As previously described, a "token" may be characterized as any sequence of characters. It may be a single character or punctuation mark, a phrase, a sentence, a paragraph, multiple paragraphs, or a combination of the aforementioned forms. During the tokenization operation 312, key words from the message data input 302 may be isolated and associated with requesting content. For example, the word "attachment" or the phrase "can you please send" may indicate that the message is a request-for-content (RFC) message. Other tokens may include a question mark or other punctuation marks that may indicate an RFC-type message.

After the message data input 302 is processed through the tokenization operation 312, the message data input may then be analyzed by the feature extraction component 314. The feature extraction component may extract lexical features 324 and contextual features 320 from the message data input 302 for use by the domain classification component 316. The lexical features 324 that may be analyzed in the feature extraction component 314 may include, but are not limited to, word n-grams 322. A word n-gram is a contiguous sequence of n words from a given sequence of text. As should be appreciated, analyzing word n-grams may allow for a deeper understanding of the message data input and therefore provide more accurate and intelligent determinations as to whether or not the message is requesting content. The machine-learning algorithms may be able to compare thousands of n-grams, lexical features, and contextual features in a matter of seconds to extract the relevant features of the message data. Such rapid comparisons are impossible to employ manually. The contextual features 320 that may be analyzed by the feature extraction component 314 may include, but are not limited to, a top context and an average context. A top context may be a context that is determined by comparing the topics and key words of the message data input with a set of preloaded contextual cues. An average context may be a context that is determined by comparing the topics and key words of historical processed message data, historical intelligent queries and suggested attachable entities, manual inputs, public social media profiles, and other data. The feature extraction component 314 may also skip contextually insignificant message data when analyzing the textual input. For example, a token may be associated with article, such as "a" and "an." However, because articles are typically insignificant in the English language, the feature extraction component 314 may ignore these article tokens.

After the feature extraction component 314 extracts the pertinent lexical features 324 and contextual features 320 of the message data input, the message data may be transmitted to the domain classification component 316. The domain classification component 316 analyzes the lexical features 324 and the contextual features 320 that were previously extracted from the feature extraction component 314. These lexical and contextual features may be grouped into specific classifiers for further analysis. The domain classification component 316 may also consider statistical models 326 when determining the proper domain that should be selected for the intelligent queries that will be fired against an external search engine. In some example aspects, the domain classification component 316 may be trained using a statistical model or policy (i.e., prior knowledge, historical datasets) with previous message data inputs. For example, the phrase "PowerPoint presentation" may be associated with a specific PowerPoint® token. Additionally, the phrase "PowerPoint presentation" may be associated with a broader domain classification, such as "presentations" in general or "attachments" in general.

After proper domain classifications are assigned to the message data input at operation 316, the message data input may then be sent to the semantic determination component 318. The semantic determination component converts the message data input into a domain-specific semantic representation based on the domain that was assigned to the message data by the domain classification component 316. The semantic determination component 318 may draw on specific sets of concepts and categories from a semantic ontologies database 330 to further determine if the message is requesting content and exactly which type of content the message data input 302 is requesting. For example, a user may receive an electronic message that says, "Can you please send me the presentation from yesterday's meeting?" The phrase "presentation from yesterday's meeting" may indicate that the sender desires to receive an attachable entity (the "presentation") from a certain event ("yesterday's meeting"). The key words and phrases of "presentation" and "yesterday's meeting" may have previously been assigned domains by the domain classification component 316, and as a result, the semantic determination component 318 may then determine that the sender specifically desires to receive the presentation from a meeting that was held yesterday according to the calendar data of the user. Thus, method 300 may access the calendar data of the user, determine that the user had a meeting yesterday, and further determine that the sender was a participant in that meeting from yesterday.

In other example aspects, the semantic determination component 318 may have pre-defined semantic frames 328 associated with third-party applications. For example, a sender may transmit a voice message that says "Can you please send me that picture you took of our outreach event last week?" The semantic determination component 318 may determine that the sender is requesting content, specifically a picture. Search information that may be pre-defined by the semantic frames 328 may include, but is not limited to, local picture files and third-party picture applications that may store pictures remotely in a cloud server.

After the natural language processor 320 has determined that the message is requesting content, a candidate set of terms and their contexts may be extracted from the incoming message. A value may be generated for each term in the candidate set of terms. Based on that score, the candidate terms may be ranked by decreasing predicted effectiveness. The optimal number of terms may be predicted by computing the value of the effectiveness function on a special End-of-Ranking (EOR) word for that specific request email and use the terms with larger predicted effectiveness to fire against the external search engine. The query may then be fired against an external database. The external database, as previously mentioned, may search both local and remote repositories for the top K attachable entities. From the top K attachable entities, a suggestion set may be generated at operation 336. The suggestion set may comprise a set number of attachable entities to display to the user. For example, the suggestion set may comprise the top three most relevant attachable entities. Following the generation of the suggestion set at operation 336, the suggestion set is provided to the user in operation 338. The provided suggestion set may then be saved for future reference in the suggestion set saver database 340.

As should be appreciated, the various methods, devices, components, etc., described with respect to FIG. 3 are not intended to limit systems 300 to being performed by the particular components described. Accordingly, additional topology configurations may be used to practice the methods and systems herein and/or components described may be excluded without departing from the methods and systems disclosed herein.

Figure 4:
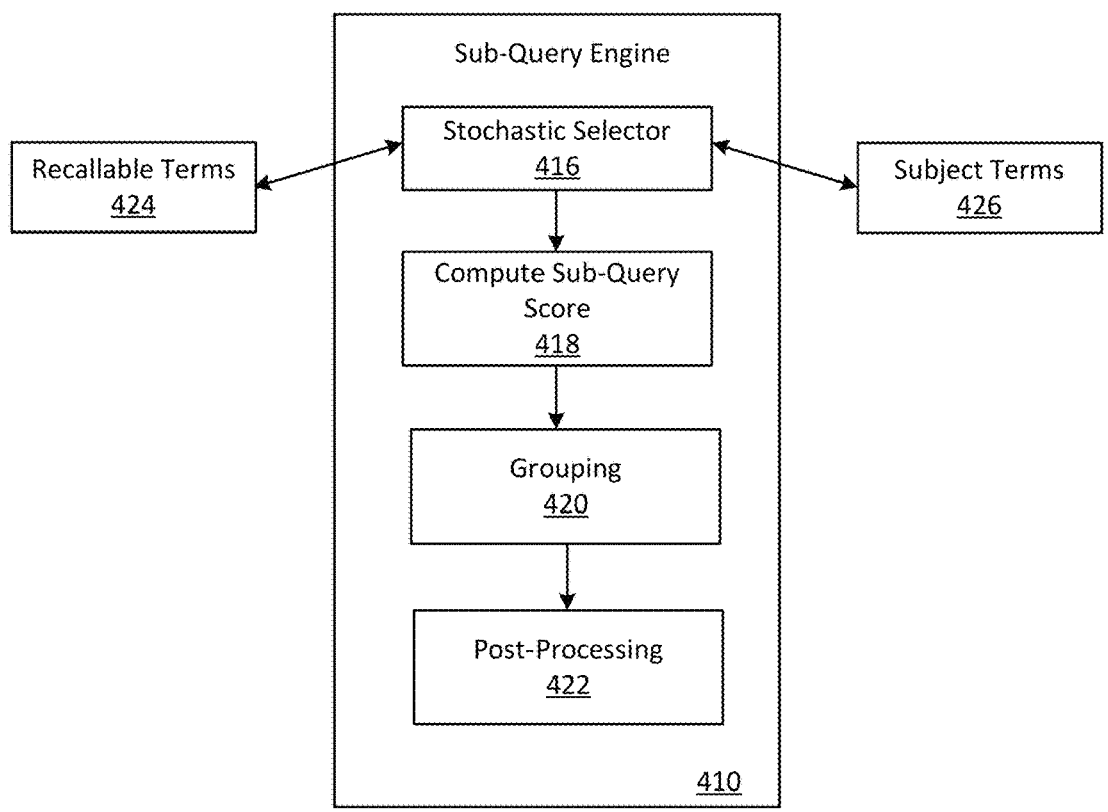
FIG. 4 is a block diagram illustrating a method for generating a sub-query for training an intelligent email attachment system.

FIG. 4 is a block diagram illustrating a method for generating a sub-query for training an intelligent email attachment system.

The intelligent email attachment retrieval system may be trained according to at least one learned function (e.g., a neural network). For example, a candidate set of terms may be extract from a request message, or a set of terms may be generated through other query expansion methods. All possible subsets of the candidate query set may be generated. Each subset may be executed as a query. The effectiveness of retrieving the desired attachment (which is known during the training phase) of each subset may be computed. The candidate subsets that exceed a certain threshold may be retained, while other subsets below a certain threshold may be discarded. The subsets above the certain threshold may be used to train a function (e.g., implemented as a neural network) to determine effectiveness of retrieving the desired attachable entity from certain query terms and their context.

At least one set of candidate sub-queries may be extracted for a training set through occurrence statistics, such as the frequency of the word in a past collection of emails (e.g., using Inverse Document Frequency weighting schemes). Given a request message and its associated target attachable entity that is attached to reply, the objective may be to select the top K terms that are most likely to retrieve the desired entity. The candidate sub-queries may precede the actual query that is sent to the external search engine to retrieve the desired attachable entity. The candidate sub-queries may be used as training data that the intelligent query system may consider when selecting a query to send to the external search engine.

The sub-query engine 410 begins generating at least one sub-query with stochastic selector 416. "Stochastic" may refer to the uniform sampling of the query term candidates from at least one subject and/or recallable terms. In an ideal scenario, all terms in an email message may be considered as candidate sub-queries. However, considering all terms in an email message may be computationally intractable, as email messages tend to average at least 100 words or more. In order to circumvent the intractability accompanied with computing candidate sub-queries, the sub-query engine 410 may implement a stochastic selector 416 to select candidate query terms. The stochastic selector 416 may consider at least two sources for query terms. In some example aspects, the stochastic selector 416 may consider subject terms 426. Subject terms 426 may comprise nouns and/or topic terms in the subject of the request message. In other example aspects, stochastic selector 416 may consider recallable terms 424. Recallable terms 424 may comprise infrequent terms that occur frequently in electronic messages that contain the attachable entity or content related to the desired attachable entity. For example, a recallable term 424 may occur in at least 30% of messages associated with attachable entity A, occur in less than 1% of messages not associated with attachable entity A, and was received in a user's mailbox within a certain timeframe. Candidate sub-queries may be initially selected by the stochastic selector 416 from either subject terms 426, recallable terms 424, or a combination of both subject terms 426 and recallable terms 424. The stochastic selector 416 may discard "noisy" terms. Noisy terms may comprise stop words (i.e., words that may not contain important significance in a search query), digits, punctuation, and the names of the sender and recipients that occur in the email headers. In some example aspects, the set of sub-queries may comprise a portion of terms from the email message. These terms may comprise subject terms 426, recallable terms 424, a combination of both subject terms 426 and recallable terms 424, or terms that may not be considered subject terms 426 or recallable terms 424 but are nonetheless significant. In other example aspects, every term in an email message may be considered as a candidate sub-query. This may occur when an email message comprises less than 100 terms (or tokens).

Once a set of candidate sub-queries is selected by the stochastic selector 416, each candidate sub-query may be scored at the compute sub-query score operation 418. In some example aspects, the sub-query scores may be calculated using a retrieval system that compares certain attachable entities to the candidate sub-queries for similarities in terms. In other example aspects, the sub-query scores may be calculated according to frequency of the terms found in an email inbox. For example, a certain term that is rarely found in an email mailbox may have a higher sub-query score than a term that frequently appears in messages in an email inbox. In other example aspects, the sub-query terms may be compared against a known database of vocabulary terms. If the sub-query terms match up with certain words in the database that typically return a certain attachable entity, the sub-query may receive a higher score.

After the sub-query scores are computed at operation 418, the sub-queries may be grouped at grouping operation 420 according to performance. For example, sub-query terms like "gates family," "bill gates family," and "bill gates" may all return similar sub-query scores. As a result, these sub-query terms may be combined into one query. For example, two queries—"gates family" and "bill gates"—may be grouped into "bill gates family." As a result, only the phrase "bill gates family" may be used as a candidate sub-query, rather than "gates family" and "bill gates." Not including certain terms in a query may cause undesirable learning by method 400 and the intelligent query system disclosed herein.

After the grouping of candidate sub-query terms, the post-processing operation 422 may be initiated. The post-processing operation 422 may consist of further narrowing the groups of candidate sub-queries through removal of supersets of sub-queries that perform worse than other supersets of sub-queries. For example, certain terms and phrases that do not indicate the retrieval of a certain attachable entity may have a lower score than certain terms and phrases that do indicate retrieval of a certain attachable entity. The sub-queries that have higher scores may be kept, while the sub-queries that have lower scores may be discarded. The determination to keep or discard certain sub-queries in the post-processing operation 422 may be according to a certain threshold score defined by the sub-query engine 410.

As should be appreciated, the various methods, devices, components, etc., described with respect to FIG. 4 are not intended to limit systems 400 to being performed by the particular components described. Accordingly, additional topology configurations may be used to practice the methods and systems herein and/or components described may be excluded without departing from the methods and systems disclosed herein.

Figure 5:
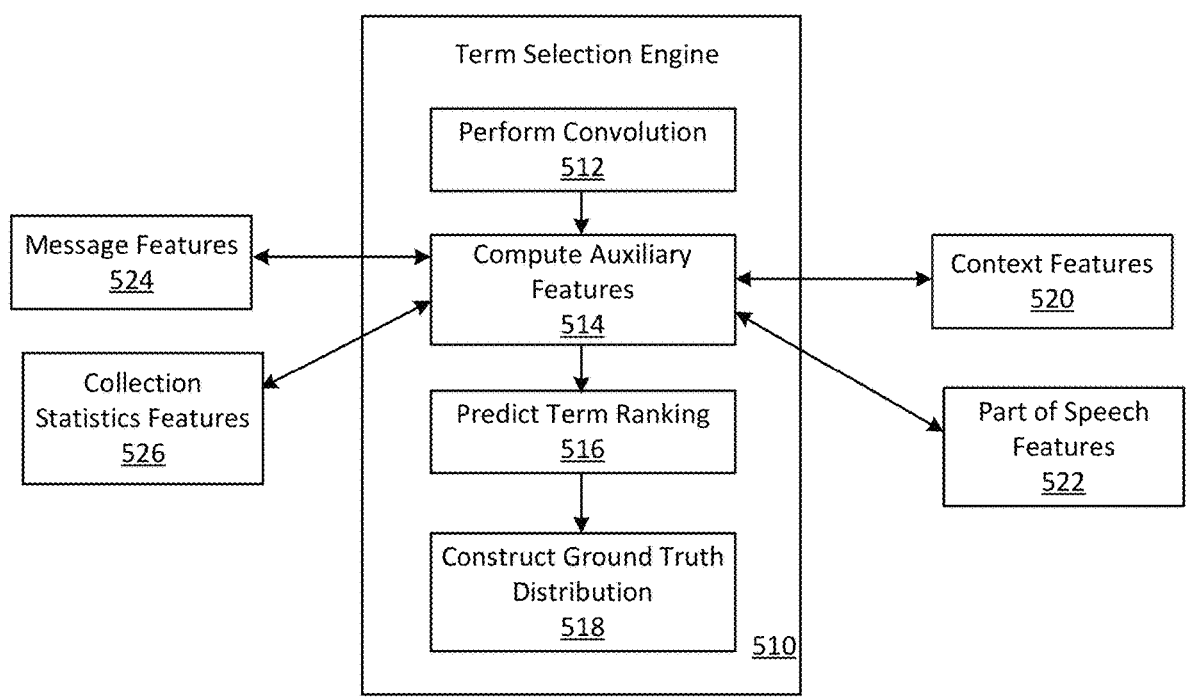
FIG. 5 is a block diagram illustrating a method for training the intelligent email attachment system to select optimal query terms.

FIG. 5 is a block diagram illustrating a method for training the intelligent email attachment system to select optimal query terms.

After method 500 obtains a set of candidate sub-queries from a sub-query generator, a model may be trained that learns to generate a ranking of message terms and determines how many terms of the message term ranking should be included in the query. In order to determine the number of terms included in the query, the model may learn to rank an end-of-ranking (EOR) token in addition to the message terms. For example, consider the following request message:

Did we receive a transition document from X Company?
Steve asked me yesterday about it in my 1:1 with him.
Can you forward me a copy?

These terms may be ranked according to relevance and likelihood of retrieving the desired attachable entity. For example, the phrases "X Company" and "transition document" may receive higher scores than the EOR token, and therefore, those phrases may be included in the query that is submitted to the external search engine. Conversely, the phrases "Steve" and "1:1" may receive lower scores than the EOR token, and therefore, those phrases may be excluded from the query that is submitted to the external search engine.

The term selection engine 510 may begin with perform convolution operation 512. A convolution may be performed over the message terms. In some example aspects, the convolution operation 512 may be performed on all the terms in a message, regardless of score. The convolution may be the first step in computing the effectiveness of each term. In some example aspects, when a convolution is computed, it is not known whether other terms have a higher score than the End-of-Ranking token. Each term in the convolution model may be characterized by (1) the term itself and (2) the 2*L terms surrounding the term where L is a context width hyper-parameter. The convolution may consist of considering a "sliding window" centered on one term at a time and comprising 2*L terms around it. For example, the term "attachment" in an email request message may indicate that the words surrounding that term should receive higher scores than the scores of those same words if they were not within 2*L terms of the term "attachment." The scores that may be associated with certain terms in the convolution may be used to determine an estimated "effectiveness score" for the middle term in the "sliding window."

After performing the convolution operation 512, the auxiliary features of the message may be computed at operation 514. Auxiliary features may comprise message features 524, collection statistics features 526, context features 520, and part of speech features 522. Message features 524 may comprise variables, such as is_subject, which may determine whether a term occurs in the subject line of the request message. Other variables in the message features 524 may include is_body (which determines whether the term is in the body of the message), TF (term frequency—relative or absolute), position of the term, and is_oov_repr (term does not have a learned representation). Collection statistics features 526 comprise inverse document frequency of the term, absolute collection frequency, relative collection frequency, Kullback-Leibler divergence from the unsmoothed collection term distribution to the Jelinek-mercer smoothed document term distribution, similarity collection, inverse collection term frequency, pointwise simplified clarity score. Context features 520 may comprise the term representation, which is learned as part of the model, and the context, which is learned as part of the model, of the term surrounding the term occurrence. Part of Speech features 522 may comprise is_noun, is_verb, and is_other to denote to which part of speech each term belongs.

The auxiliary features may be computed at operation 514 by using a min-max feature scaling on the message-level such that all auxiliary feature values are between 0 and 1. The flattened embeddings, concatenated with the auxiliary feature, may be fed to a neural network. The neural network may predict the term ranking at operation 516. The higher the score of the term, the more relevant the term may be, and therefore, the term may be submitted to the external search engine for attachable entity retrieval.

The term selection engine 510 may conclude with the ground truth distribution operation 518. The ground truth distribution operation 518 may determine the probability mass assigned to the EOR token, as well as the other terms in the email message. This ground truth distribution operation 518 may depend on trained models according to a set of candidate sub-queries.

During operation of the intelligent email attachment system, the optimal number of terms may be predicted by referring to the results from the term selection engine 510. The results from the term selection engine 510 may be utilized to determine the effectiveness of certain terms received from an incoming message.

As should be appreciated, the various methods, devices, components, etc., described with respect to FIG. 5 are not intended to limit systems 500 to being performed by the particular components described. Accordingly, additional topology configurations may be used to practice the methods and systems herein and/or components described may be excluded without departing from the methods and systems disclosed herein.

Figure 6A:
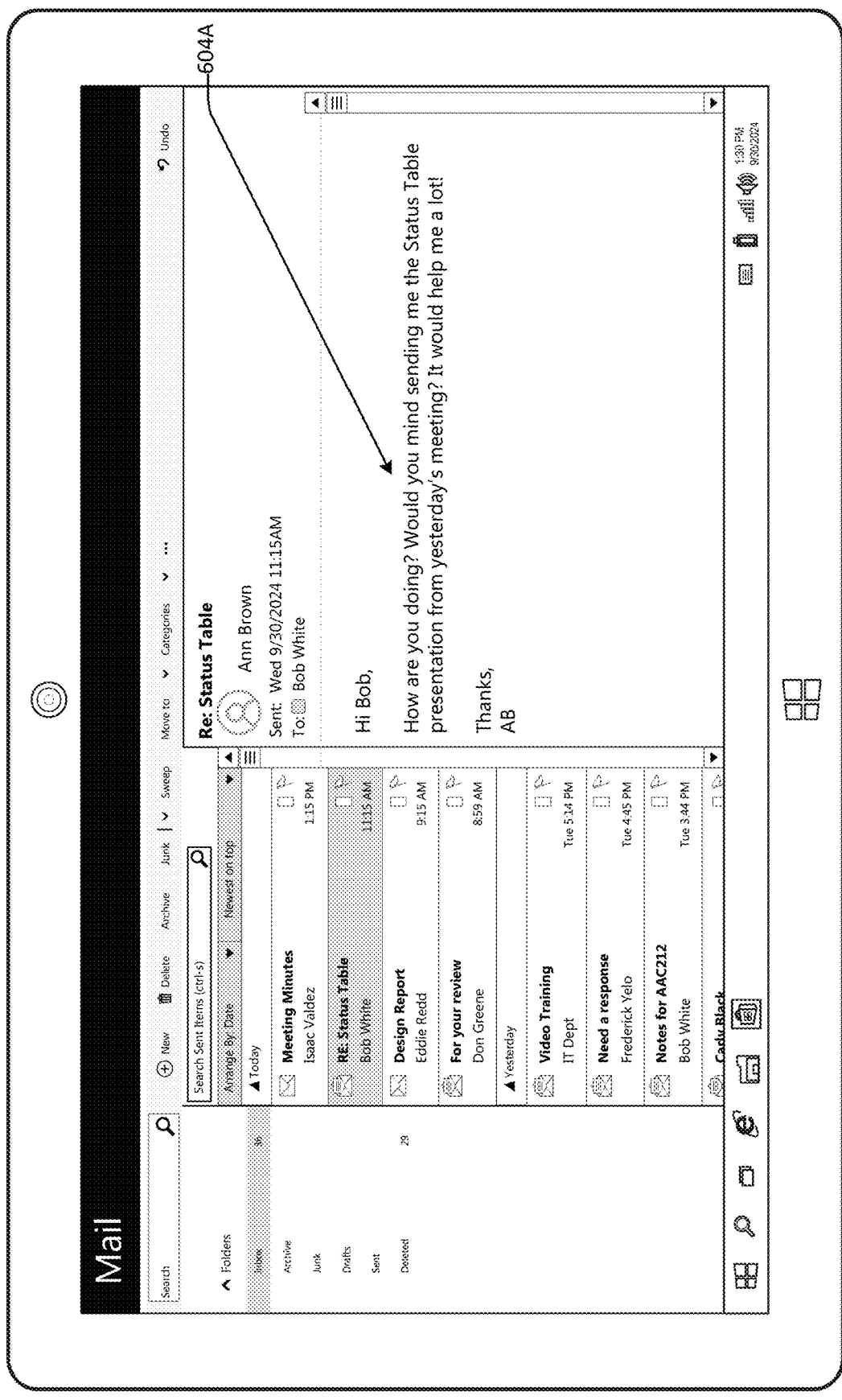
FIG. 6A illustrates an example of an electronic mail application before an intelligent query is applied.

FIG. 6A illustrates an example of an electronic mail application before an intelligent query is applied.

System 600 may include electronic device 602A, which his running an electronic mail application, such as Microsoft® Outlook. A message 604A may be displayed within the electronic mail application. Before message 604A is analyzed through the intelligent query system disclosed herein, the system may not know if message 604A is requesting content.

In some example aspects, the intelligent query system may be manually disabled. In some other example aspects, the intelligent query system may be automatically enabled upon sign-in to an electronic mail application or other application, such as Microsoft® Teams.

Figure 6B:
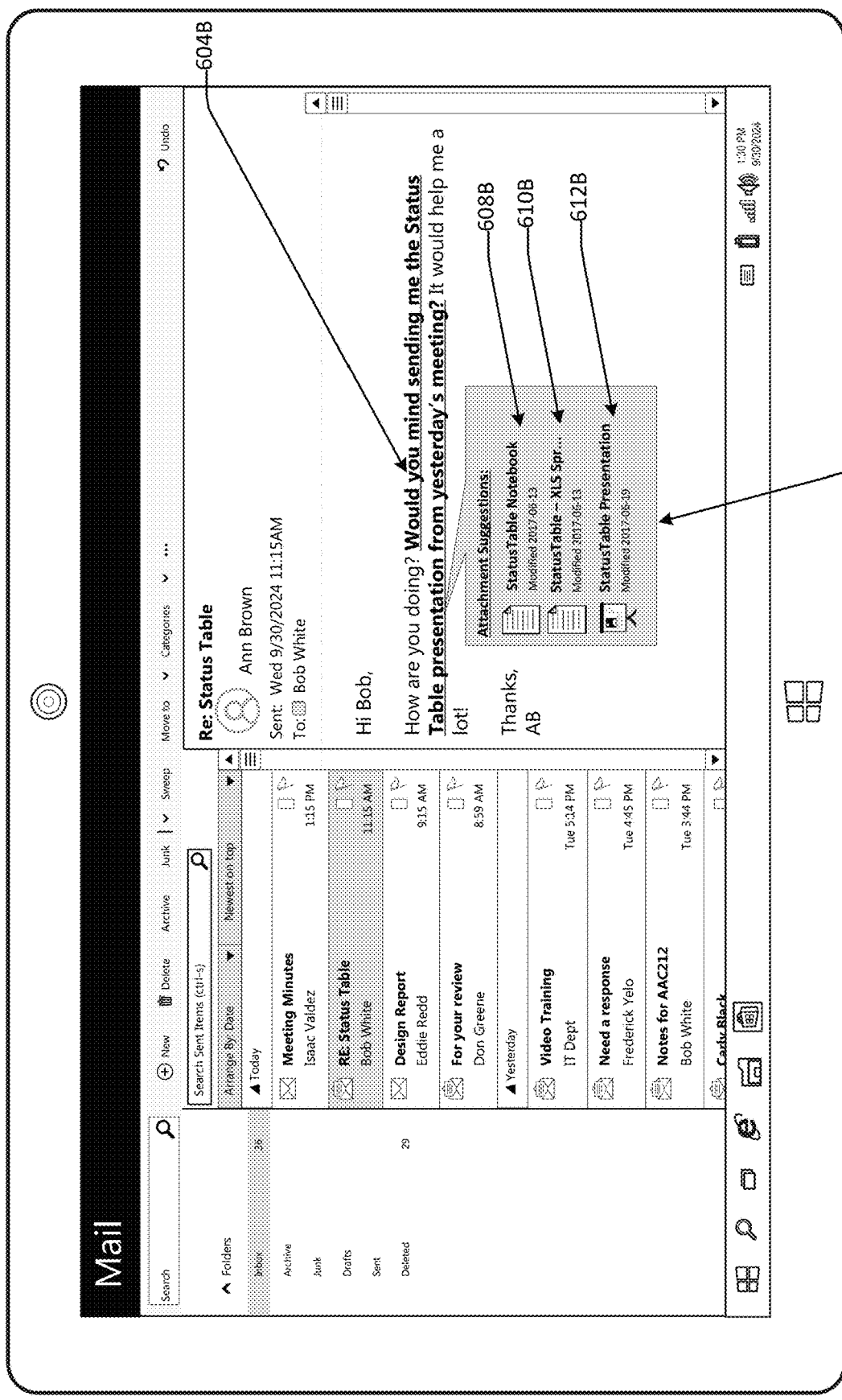
FIG. 6B illustrates an example of electronic mail application after an intelligent query for email attachment retrieval is applied.

FIG. 6B illustrates an example of electronic mail application after an intelligent query for email attachment retrieval is applied.

System 600 may include an electronic device 602B that is running an electronic mail application. The electronic mail application may display a message 604B. After receiving the message 604B, the intelligent query system may be automatically applied to message 604B. As previously described, the intelligent query system may process the message for request-for-content (RFC) characteristics by utilizing a natural language processor. A query may be generated according to a trained model (e.g., a neural network). The query may then be fired against the external search engine. The external search engine may then search among local repositories and remote repositories for the relevant attachable entities. The highest ranked attachable entities may be retrieved and presented for the user to select.

In this example, the phrases "sending me," "Status Table presentation," and "yesterday's meeting" may all be the most relevant query terms. The "sending me" phrase may indicate that the message is a request for content. The "Status Table presentation" may be used with the external search engine to find certain types of presentation documents (e.g., PowerPoint, Prezi, PDF, etc.) or attachable entities with the phrase "status table" in the title of the entity, in the body of the entity, or in both the title and the body of the attachable entity. The phrase "yesterday's meeting" may prompt the external search engine to also consider a certain time frame. The intelligent query system may use the receipt timestamp to determine which date was "yesterday." From that determination, the system may search the recipient's calendar and search through previous calendar events. In some example aspects, the time of the previous meeting may be used to determine the most relevant attachable entities. For example, a document that was opened during the same time as the meeting may receive a much higher relevance score than a document that was closed during the meeting.

After the suggestion set of attachable entities is generated, the suggestion set may be displayed in a suggestion set box 606B. The suggestion set box may comprise the top K attachable entities. The top K attachable entities are the most relevant entities according to the intelligent query system disclosed herein. In this example aspect, the top K attachable entities comprise the Status Table Notebook 608B, the Status Table XLS 610B, and the StatusTable Presentation 612B. Upon receiving these suggestions, a user may select any of the attachable entities to automatically attach to a reply message.

In some example aspects, the intelligent query system may be activated upon creation of a new message, such as an email message, text message, instant message, etc. For example, a user may create an email message that says "Please take a look at the attached presentation from yesterday." While composing the message, the intelligent query system disclosed herein may receive the input message, process the input, and provide a list of suggested attachable entities to the user. The natural language processor may determine that the composed message is attempting to send content by extracting key words and phrases, such as "attachment" and "presentation from yesterday." In the example aspect described in this paragraph, the intelligent query system may cross-reference a third-party application of the user to find an event from "yesterday" that involved a presentation. The system may use the calendar information to the filter through possible attachable entities, narrowing the set of attachable entities to a presentation document that was open during an event from "yesterday." Additionally, the intelligent query system may consider the proposed recipient of the email in the system's search for the attachable entity. For example, the calendar data may show three different meetings from "yesterday," but only one of those meetings shows the intended recipient as an attendee. As a result, the intelligent query system may focus on the meeting that the intended recipient attended. The intelligent query system may then filter the possible attachable entities according to the third party calendar data and natural language processor results to determine a set of most desired attachable entities to present to the user.

Figure 6C:
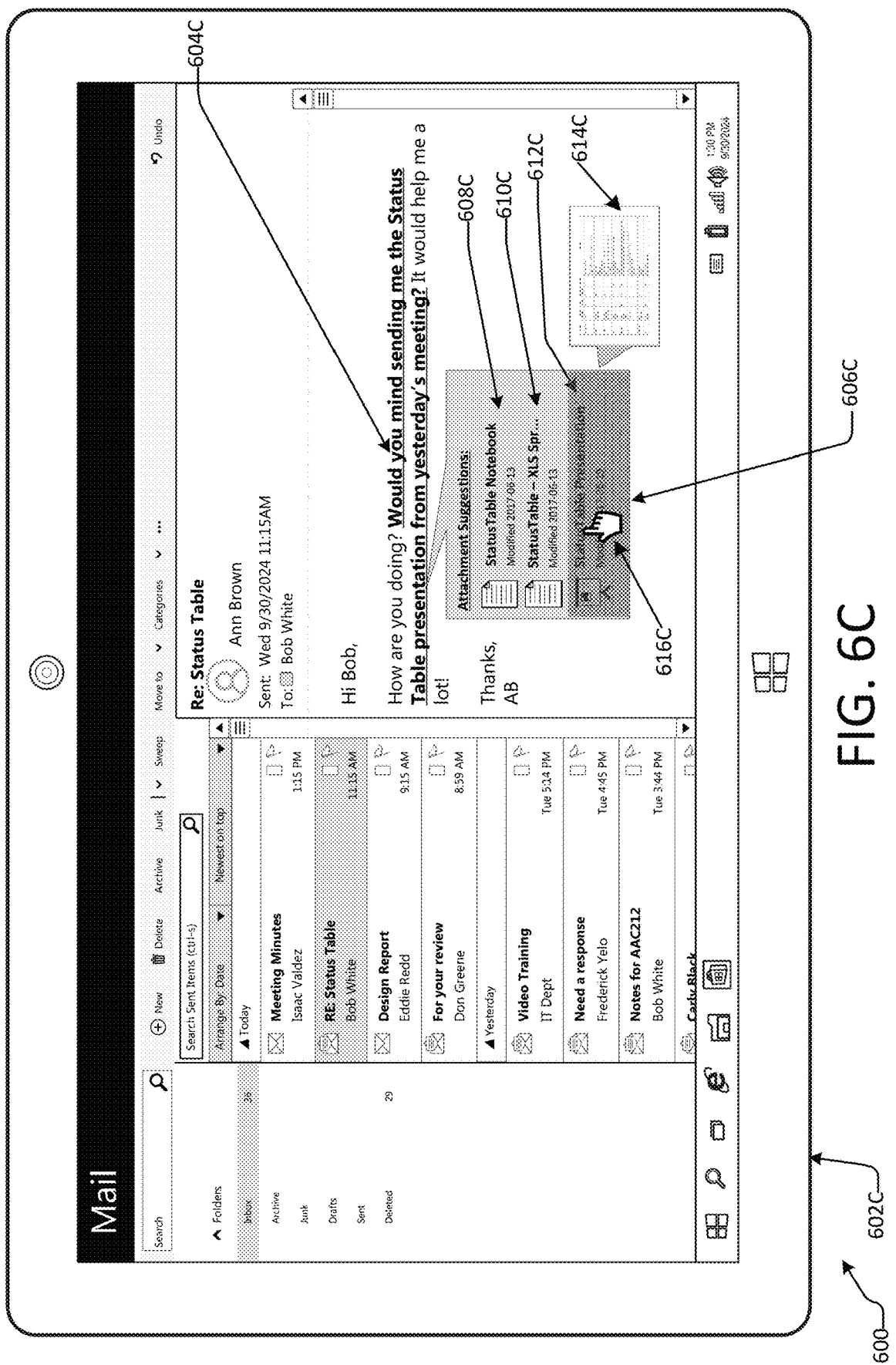
FIG. 6C illustrates an example of an electronic mail application after hovering over a suggested attachment.

FIG. 6C illustrates an example of an electronic mail application after hovering over a suggested attachment.

System 600 may include electronic device 602C. The message 604C has been identified as a request for content, the intelligent query system has been applied to the message, and a suggestion set of attachable entities is displayed in the suggestion set box 606C. When a user uses a mouse 616C to hover over one of the top K attachable entities 608C, 610C, and 612C, a preview 614C may pop-out adjacent to the suggestion set box 606C. Here, preview 614C is a preview of the StatusTable Presentation 612C.

As should be appreciated, the various methods, devices, components, etc., described with respect to FIGS. 6A, 6B, and 6C are not intended to limit systems 600 to being performed by the particular components described. Accordingly, additional topology configurations may be used to practice the methods and systems herein and/or components described may be excluded without departing from the methods and systems disclosed herein.

Figure 7:
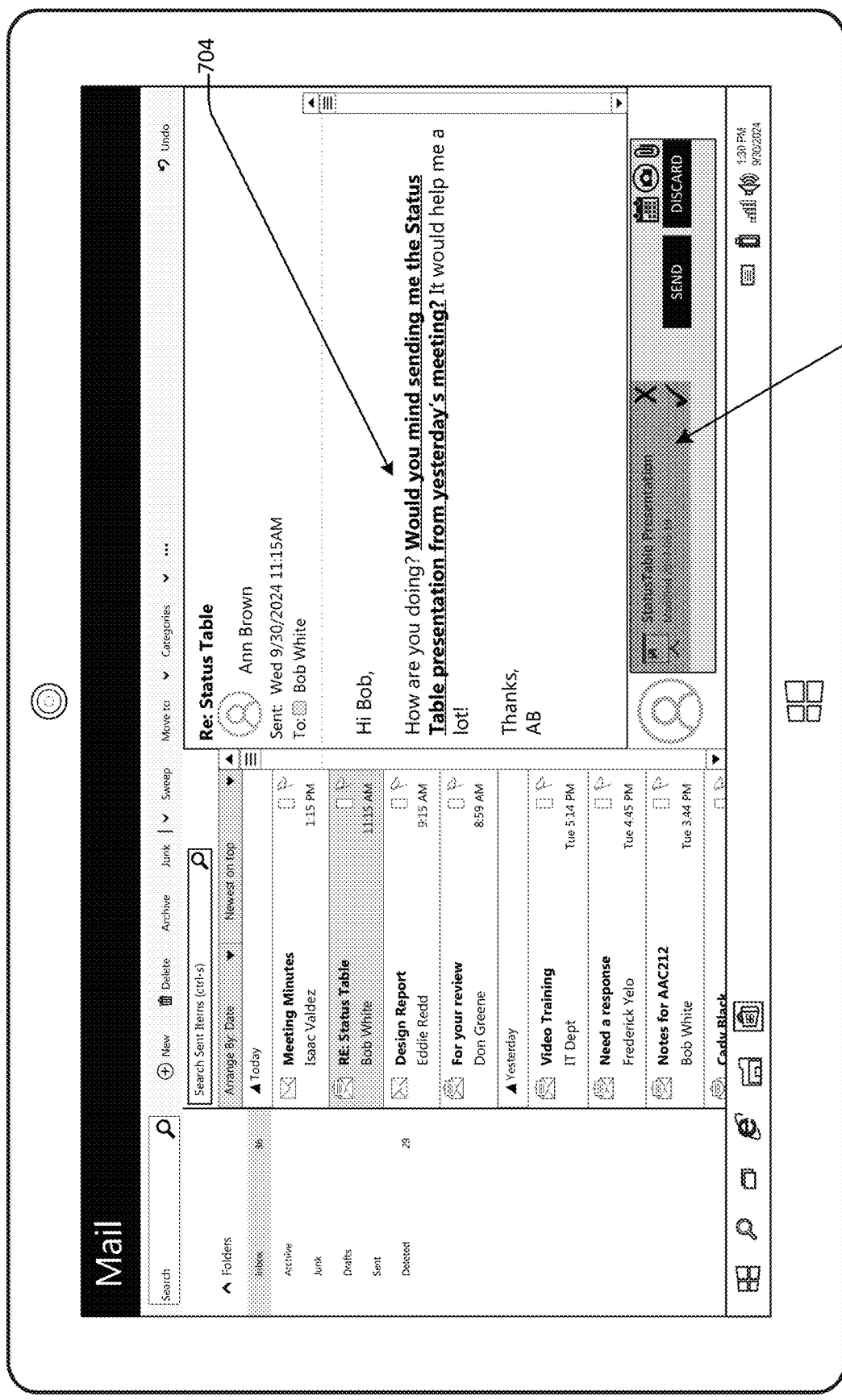
FIG. 7 illustrates an example of an electronic mail application after a suggested attachment is selected.

FIG. 7 illustrates an example of an electronic mail application after a suggested attachment is selected.

Once a suggested attachable entity is selected, the attachable entity may be attached to the reply message. System 700 may include electronic device 702, which is running an electronic mail application. The electronic mail application may display message 704, which has already been processed by the intelligent query system. A suggested set of attachable entities may have already been displayed to a user, in which the user selected the most appropriate attachable entity to attach to the reply message. The attachment 706 may have been the suggested attachable entity that the user selected. The attachment 706 may have been in the top K most relevant attachable entities according to the intelligent query system. Once the attachment is attached to the draft reply message, a user may send the reply message with the attachable entity back to the initial sender of the message requesting content.

In other example aspects, the intelligent query system disclosed herein may be applied to other applications, such as Microsoft® Teams. For example, Microsoft® Teams is a group chat software application that integrates people, content, and tools. Within Teams, a person may request content from another team member. That team member may utilize the intelligent query system disclosed herein to select the desired attachable entity and attach it to a reply message without having to search through local repositories or remote repositories. The incoming message may be analyzed for RFC. If RFC is detected, the message may then be processed to generate candidate sub-queries, which may be used as a training set of data to construct an actual query that will be fired against an external search engine. Once the most relevant terms from the incoming message are extracted, they may be placed into a query that is then sent to an external search engine. The external search engine may search through the Teams' message histories, local repositories, and remote repositories for the top K most relevant attachable entities. After finding the top K most relevant attachable entities, those entities may then be presented to the recipient of the incoming message. The recipient may then select among the various attachable entities the most appropriate attachable entity to attach to a reply message.

As should be appreciated, the various methods, devices, components, etc., described with respect to FIG. 7 are not intended to limit systems 700 to being performed by the particular components described. Accordingly, additional topology configurations may be used to practice the methods and systems herein and/or components described may be excluded without departing from the methods and systems disclosed herein.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, as described herein.

Figure 8:
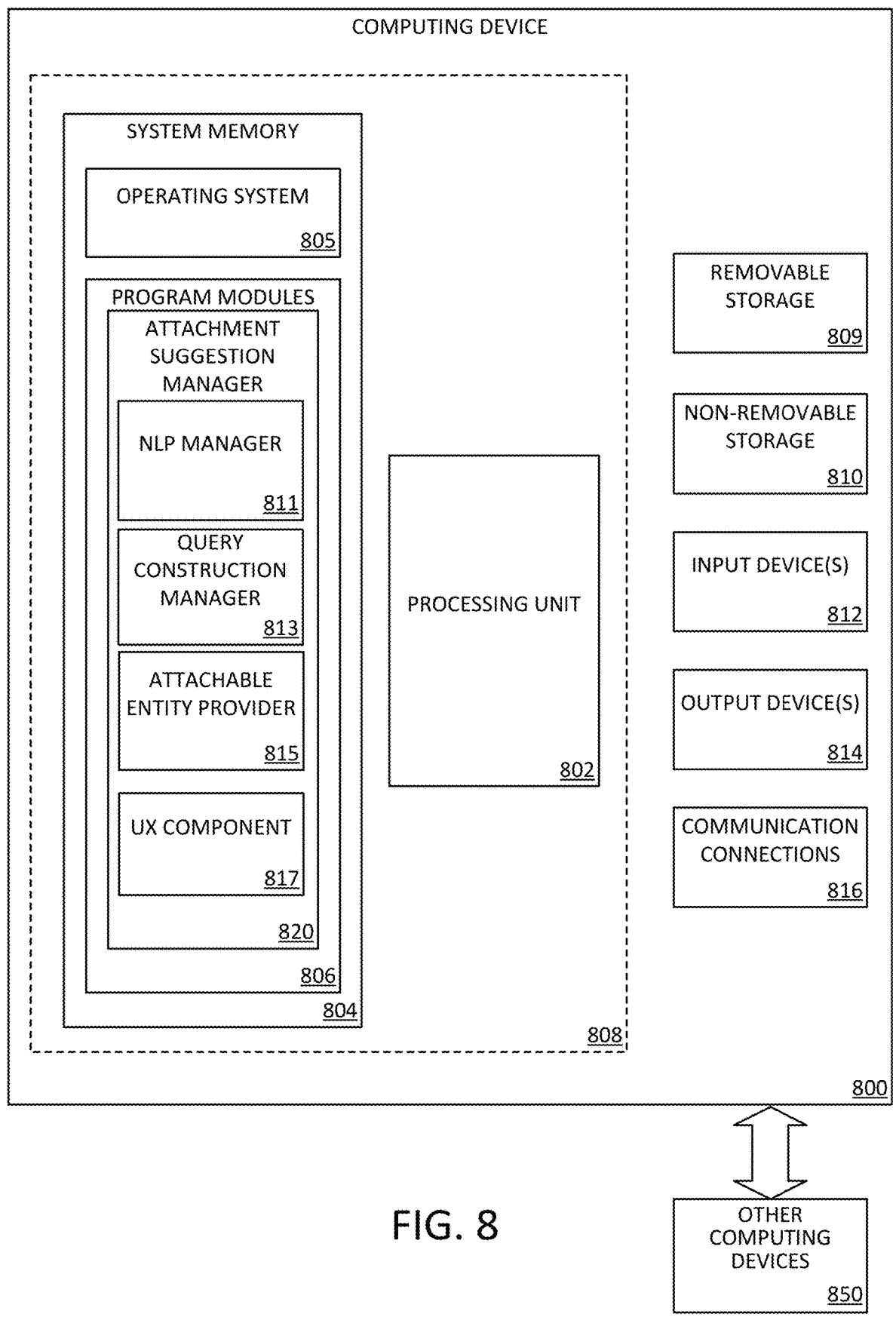
FIG. 8 is a block diagram illustrating example physical components of a computing device with which aspects of the disclosure may be practiced.

FIG. 8 is a block diagram illustrating example physical components (e.g., hardware) of a computing device 800 with which aspects of the disclosure may be practiced. The computing device components described below may have computer-executable instructions for implementing an attachment suggestion manager 820 on a computing device (e.g., server computing device and/or client computing device). The computer-executable instructions for an attachment suggestion manager 820 can be executed to implement the methods disclosed herein, including a method of automatically processing a message input, constructing an intelligent query, and providing at least one attachable entity according to the processing results. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running an attachment manager 820, such as one or more components with regard to FIGS. 1-7, and, in particular, an natural language processor (NLP) manager 811, a query construction manager 813, an attachable entity provider 815, and/or UX Component 817.

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., attachment suggestion manager 820) may perform processes including, but not limited to, the aspects, as described herein. Other program modules that may be used in accordance with aspects of the present disclosure, and in particular for automatically processing a message input, constructing an intelligent query, and providing at least one attachable entity according to the processing results, may include an NLP manager 811, a query construction manager 813, an attachable entity provider 815, and/or UX Component 817, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such tangible computer storage media may be part of the computing device 800. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
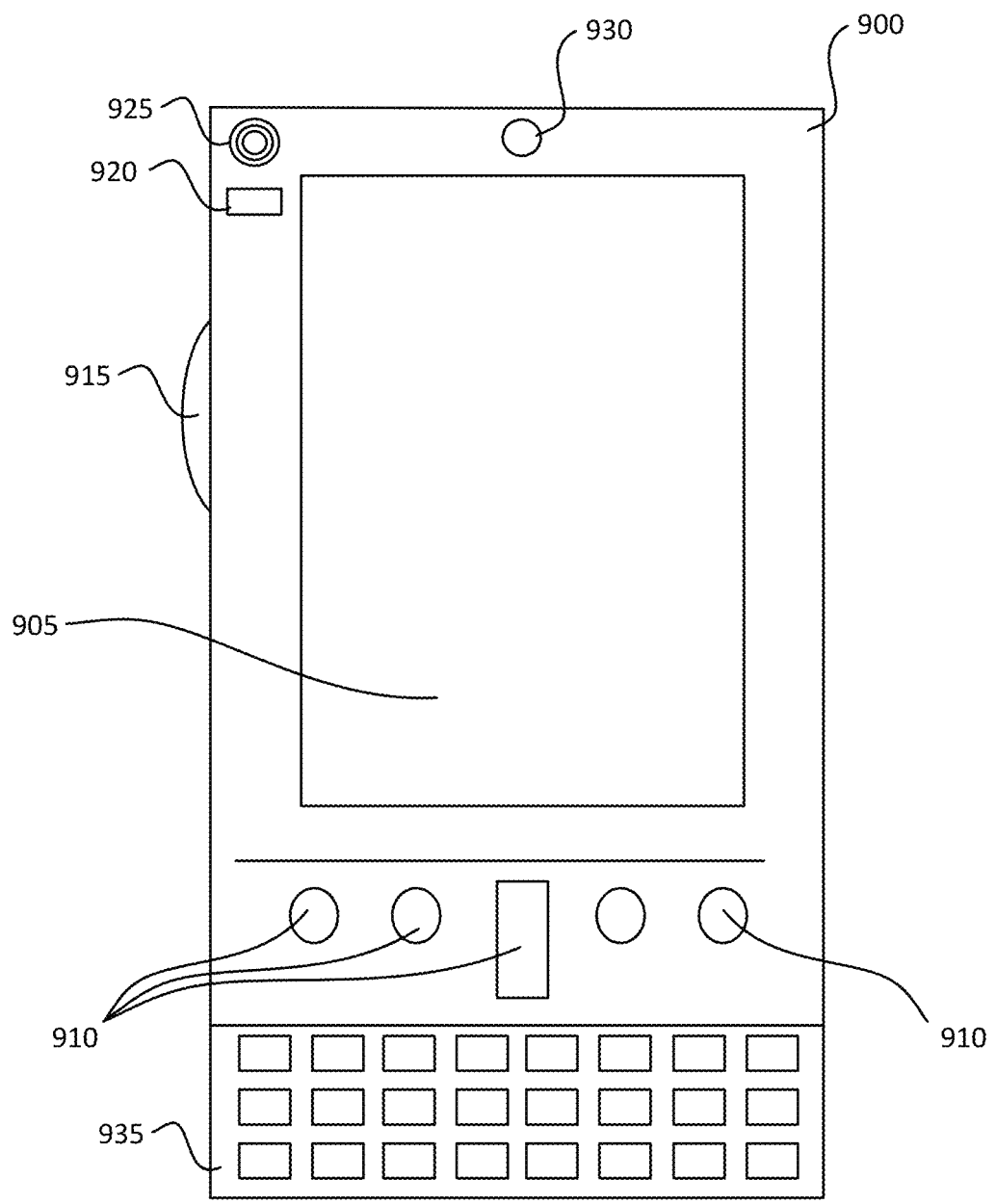
FIGS. 9A and 9B are simplified block diagrams of a mobile computing system in which aspects of the present disclosure may be practiced.
Figure 9B:
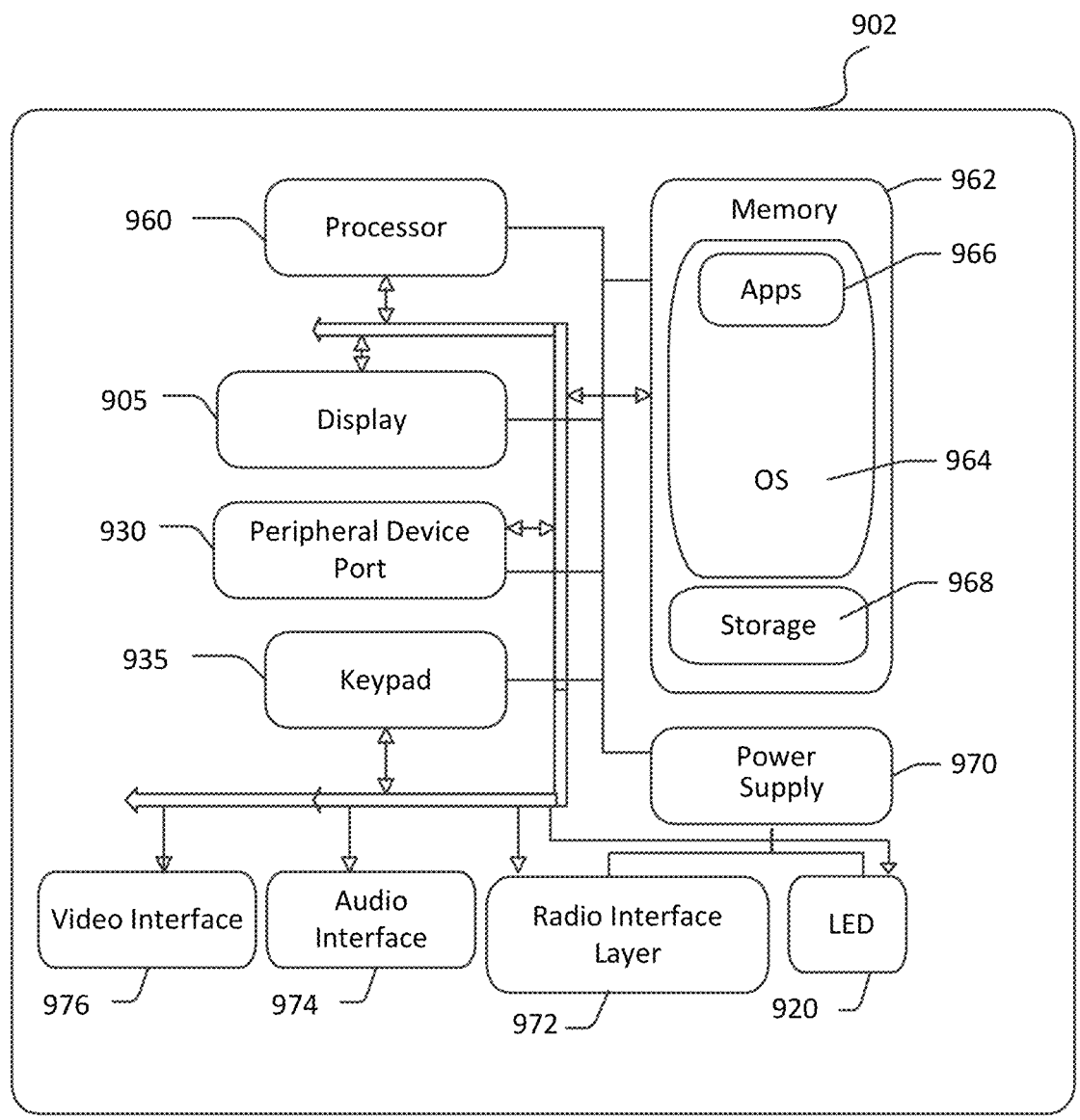

FIGS. 9A and 9B illustrate a mobile computing device 900, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the instructions for automatically processing a message input, constructing an intelligent query, and providing at least one attachable entity according to the processing results as described herein (e.g., NLP manager 811, query construction manager 813, attachable entity provider 815, and/or UX Component 817, etc.).

The system 902 has a power supply 970, which may be implemented as one or more batteries. The power supply 970 may further include an external power source, such as an AC adapter or a powered docking cradle that supplements or recharges the batteries. The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 925 (e.g., audio transducer 925 illustrated in FIG. 9A). In the illustrated embodiment, the visual indicator 920 is a light emitting diode (LED) and the audio transducer 925 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and are not intended to limit the disclosure to a particular sequence of steps or a particular combination of hardware or software components.

Figure 10:
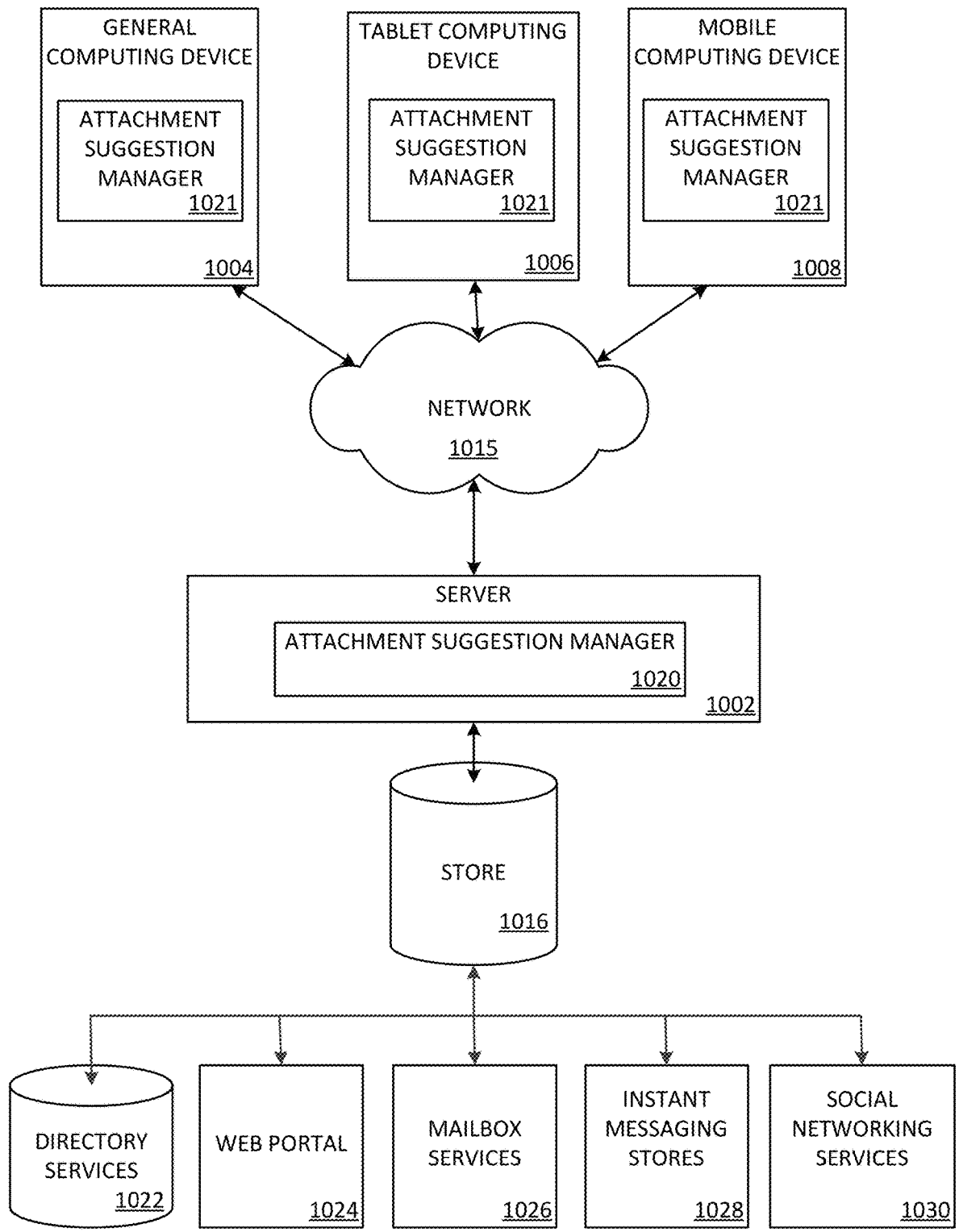
FIG. 10 is a simplified block diagram of a distributed computing system in which aspects of the present disclosure may be practiced.

FIG. 10 illustrates one aspect of the architecture of a system for processing data received at a computing system from a remote source, such as a general computing device 1004 (e.g., personal computer), tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking service 1030. The attachment suggestion manager 1021 may be employed by a client that communicates with server device 1002, and/or the attachment suggestion manager 1020 may be employed by server device 1002. The server device 1002 may provide data to and from a client computing device such as a general computing device 1004, a tablet computing device 1006 and/or a mobile computing device 1008 (e.g., a smart phone) through a network 1015. By way of example, the computer system described above with respect to FIGS. 1-9 may be embodied in a general computing device 1004 (e.g., personal computer), a tablet computing device 1006 and/or a mobile computing device 1008 (e.g., a smart phone). Any of these embodiments of the computing devices may obtain content from the store 1016, in addition to receiving graphical data useable to either be pre-processed at a graphic-originating system or post-processed at a receiving computing system.

As should be appreciated, FIG. 10 is described for purposes of illustrating the present methods and systems and is not intended to limit the disclosure to a particular sequence of steps or a particular combination of hardware or software components.

Figure 11:
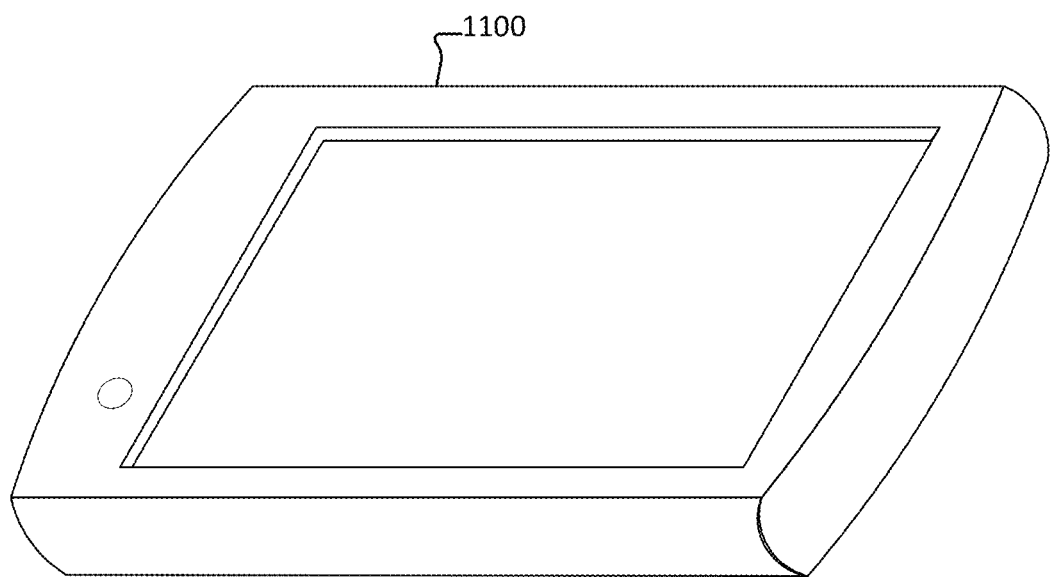
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 11 is described for purposes of illustrating the present methods and systems and is not intended to limit the disclosure to a particular sequence of steps or a particular combination of hardware or software components.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computer device comprising:
   at least one processing unit;
   at least one memory storing processor-executable instructions that when executed by the at least one processing unit cause the computing device to:
   receive a message;
   process the received message to identify a request for content in the received message;

based at least in part on the processing of the received message, construct at least one query based at least in part on the identified request for content;

submit the at least one query to a search engine;

receive, from the search engine in response to the at least one query, a set of attachable entities;

display the set of attachable entities, wherein the set of attachable entities is displayed in association with the identified request for content of the received message;

receive a selection of an attachable entity of the set of attachable entities displayed in association with the identified request for content of the received message; and subsequent to the selection of the attachable entity:

attach the selected attachable entity to a response message;

wherein constructing at least one query further comprises analyzing one or more recallable terms, wherein the one or more recallable terms comprise infrequent terms that occur frequently in electronic messages that contain: the attachable entity or content related to the attachable entity.

2. The computing device of claim 1, wherein the constructing at least one query further comprises generating at least one sub-query.

3. The computing device of claim 2, wherein generating at least one subquery further comprises analyzing at least one of recallable terms and subject terms.

4. The computing device of claim 1, wherein the set of attachable entities is ranked based at least in part on an association strength between each attachable entity and the received message.

5. The computing device of claim 4, wherein calculating the association strength further comprises identifying at least one matching term from the received message and each attachable entity.

6. The computing device of claim 1, wherein constructing at least one query further comprises constructing at least one ground-truth distribution.

7. A computer storage medium, excluding signals per se, storing instructions that, when executed by one or more processors of a computing device, cause the computing device to perform a set of operations, the set of operations comprising:

receiving a message;

processing the message to identify a request for content in the message;

constructing at least one query associated with the identified request for content in the message;

submitting the at least one query to a search engine;

receiving, from the search engine in response to the at least one query, a set of attachable entities;

displaying at least a part of the set of attachable entities, in association with the identified request for content in the message;

receiving a selection of an attachable entity of the set of attachable entities displayed in association with the identified request for content; and subsequent to receiving the selection:

attaching the selected attachable entity to a response message;

wherein constructing at least one query further comprises analyzing one or more recallable terms, wherein the one or more recallable terms comprise infrequent terms that occur frequently in electronic messages that contain: the attachable entity or content related to the attachable entity.

* * * * *